US010289446B1

United States Patent
Karppanen

(10) Patent No.: US 10,289,446 B1
(45) Date of Patent: May 14, 2019

(54) PRESERVING WEB BROWSER CHILD PROCESSES BY SUBSTITUTING A PARENT PROCESS WITH A STUB PROCESS

(71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 382 days.

(21) Appl. No.: 14/855,305

(22) Filed: Sep. 15, 2015

(51) Int. Cl.
*G06F 9/46* (2006.01)
*G06F 9/48* (2006.01)

(52) U.S. Cl.
CPC .......... *G06F 9/4831* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 6,938,254 B1 | 8/2005 | Mathur et al. | |
| 7,043,606 B2 | 5/2006 | Roskind | |
| 8,245,012 B2 | 8/2012 | Krauss | |
| 8,688,943 B2 | 4/2014 | Hays et al. | |
| 8,752,049 B1* | 6/2014 | Backensto | G06F 11/1479 714/13 |
| 9,232,010 B1 | 1/2016 | Gajapala | |
| 2003/0056076 A1 | 3/2003 | Cook et al. | |
| 2005/0015665 A1 | 1/2005 | Kato et al. | |
| 2005/0177593 A1 | 8/2005 | Solomon | |
| 2007/0169125 A1 | 7/2007 | Qin | |
| 2008/0013613 A1 | 1/2008 | Ahmad et al. | |
| 2008/0168235 A1 | 7/2008 | Watson et al. | |
| 2009/0276600 A1 | 11/2009 | Wallman | |
| 2011/0078703 A1* | 3/2011 | Dokovski | G06F 17/30884 719/315 |
| 2012/0005457 A1* | 1/2012 | Chen | G06F 9/383 712/207 |
| 2012/0209989 A1* | 8/2012 | Stewart | G06F 9/5061 709/224 |
| 2012/0323868 A1 | 12/2012 | Robbin et al. | |
| 2012/0331469 A1* | 12/2012 | Van Peursem | G06F 9/485 718/100 |
| 2013/0073401 A1 | 3/2013 | Cook | |

(Continued)

*Primary Examiner* — Tammy E Lee
(74) *Attorney, Agent, or Firm* — Knobbe, Martens, Olson & Bear, LLP

(57) ABSTRACT

Systems and methods are provided for increasing the likelihood that a set of linked processes related to an application will not be terminated while operating in a background state by substituting a stub process for a main process in the set of linked applications. In response to detecting that the computing device is likely running low on memory, a stub process is created. In some embodiments, the stub process has limited or no functionality and requires less memory than the main process. Process handles of child processes dependent on the main process are transferred to the stub process from the main process. After the transfer, the main process is terminated. In some embodiments, the process may be reversed by transferring process handles for the child process back to the main process and terminating the stub process, such as in response to detecting that the main process has restarted.

32 Claims, 13 Drawing Sheets

(56) References Cited

U.S. PATENT DOCUMENTS

| | | |
|---|---|---|
| 2013/0332942 A1 | 12/2013 | Ramesh |
| 2014/0143516 A1 | 5/2014 | Dawson |
| 2014/0143791 A1 | 5/2014 | Mark et al. |
| 2014/0325518 A1 | 10/2014 | Kim et al. |
| 2015/0347179 A1 | 12/2015 | Barraclough et al. |
| 2017/0237682 A1* | 8/2017 | Xue ........................ H04L 29/06 709/226 |

* cited by examiner

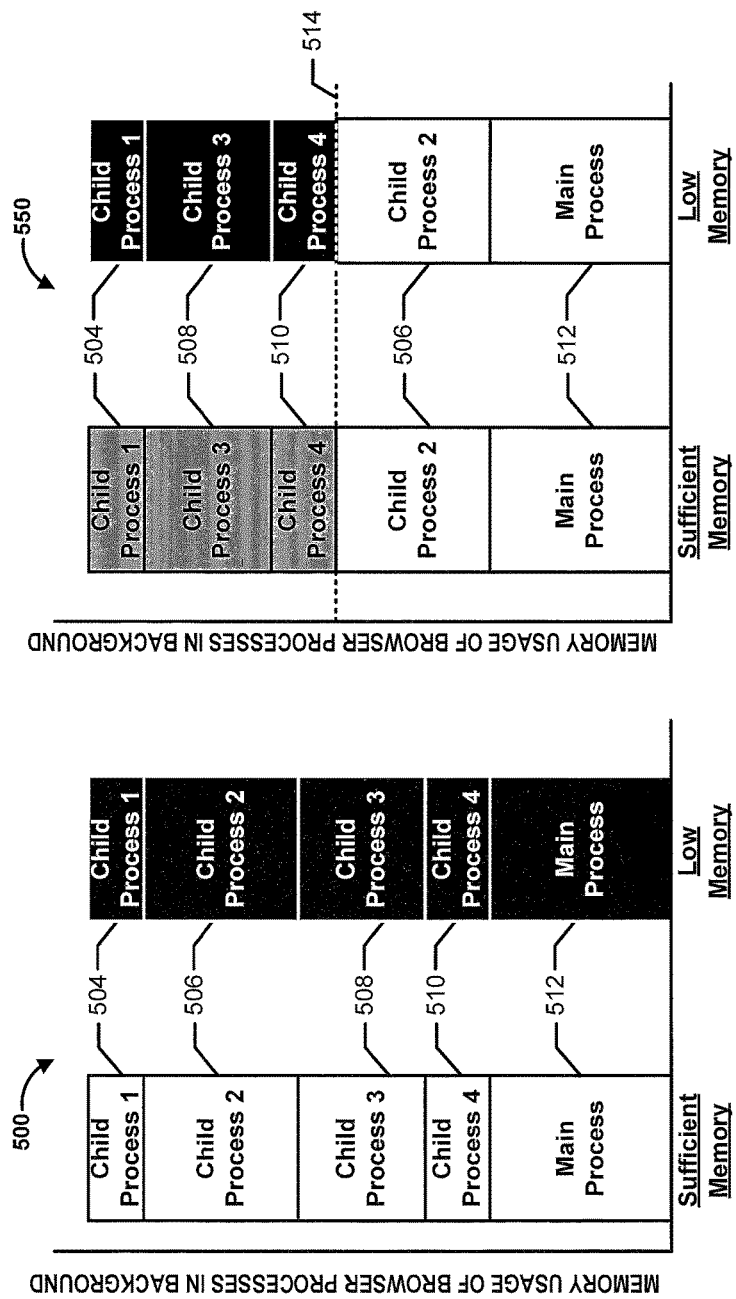
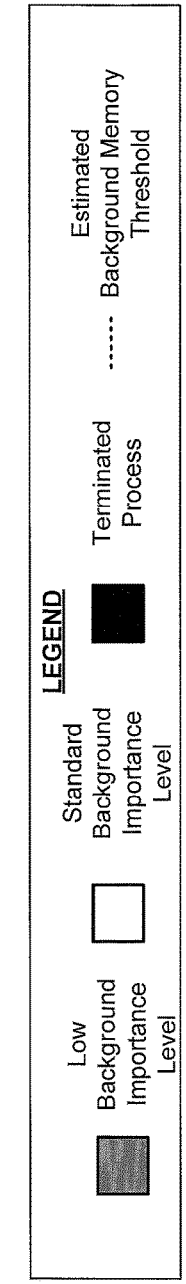
FIG. 5A
FIG. 5B

US 10,289,446 B1

PRESERVING WEB BROWSER CHILD PROCESSES BY SUBSTITUTING A PARENT PROCESS WITH A STUB PROCESS

BACKGROUND

Electronic computing devices—such as laptop computers, tablets, smart phones, and desktop computer—include operating systems or other software applications that manage resource usage on those devices. Typically, an operating system application and/or a specialized management module on a computing device allocates memory resources, processing resources, and various other resources to applications operating on the device. For example, the operating system may allocate memory resources to an application being initiated on the computing device from a pool of available memory resources.

Consumer devices typically include numerous different applications, and many of these applications are executed simultaneously. As the number of applications executing simultaneously on a computing device increases, the memory available to each of these applications decreases due to the physical limits of the computing device's memory. Eventually, if enough applications are running at the same time, the computing device runs out of available memory, resulting in application crashes, slowdowns, lost data, and various other inconveniences. Thus, managing how a finite amount of memory is allocated to numerous applications operating simultaneously on a computing device remains a challenge for device manufacturers.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 5A is a component diagram illustrating an example of memory management of processes operating in a background state.

FIG. 5B is a component diagram illustrating an example of memory management of processes operating in a background state, according to some embodiments.

DETAILED DESCRIPTION

Figure 1:
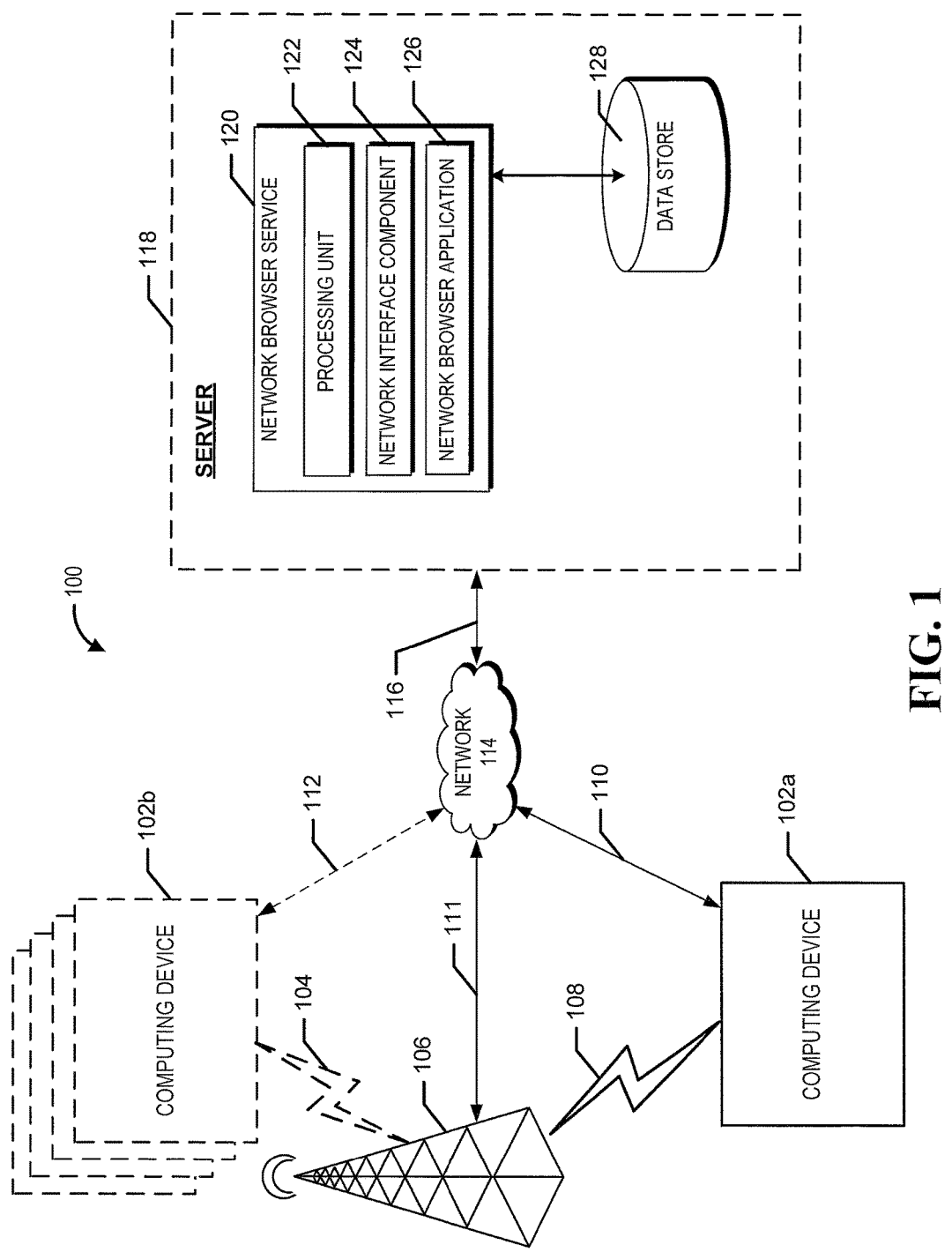
FIG. 1 is a communication system block diagram of a network suitable for use with some embodiments.

Generally described, computing devices allow for multiple applications to be substantiated at the same time. However, computing devices only have a finite amount of memory available for use by these applications running on the computing device. As a result, computing devices can only support a limited number of applications at the same time. In the event that memory must be re-allocated or repurposed, the computing device may need to forcefully stop some applications, which may cause the computing device to experience performance slowdowns, crashes, and other unwanted behaviors.

Some computing devices include mechanisms for managing the allocation and availability of memory. Specifically, in one embodiment, a computing device may implement an operating system or other application that includes a low-memory manager component operating on the computing device (sometimes referred to as a "low-memory killer"). The low-memory manager manages memory usage on the computing device in the event that memory resources on the computing device are running low. Particularly, the low-memory manager may handle situations in which the computing device is running several applications simultaneously. When the computing device is running low on memory, the low-memory manager begins terminating one or more processes. Illustratively, the low-memory manager categorizes currently instantiated processes into a hierarchy of "importance levels." The low-memory manager terminates processes in ascending order of importance until a sufficient amount of memory has been freed. For processes assigned to the same importance level, the low-memory manager can utilize additional criteria that may further prioritize which process should be terminated. For example, the low-memory managers can terminate processes that use more memory before processes that use less memory.

The low-memory manager assigns a process to one of the importance levels in the hierarchy based on the process's current state of operations/activities. For example, processes currently being rendered on the display of the computing device may be considered as operating in the "foreground" and may be deemed as having the highest importance. Other processes that have been minimized or put on standby (e.g., not currently being engaged by the user or otherwise visible to the user) may be assigned to a "background" importance level, which is lower in the importance hierarchy than the foreground level.

An application being instantiated on a computing device is often made up of a set of linked processes (sometimes also referred throughout this description as "a group" of related processes). In some instances, a group of processes may be organized such that one or more processes depend on one or more base processes to continue operating. For example, a process group may include a parent/main process and one or more child processes that depend on the parent/main process to operate. Thus, once a group of processes—such as a set of linked processes related to a browser application—transitions to the background, the overall importance level of the group is lowered, putting each of the processes at a higher risk of termination. In some embodiments, the low-memory manager may simply terminate all the processes having the same associated importance level. In other embodiments, the low-memory manager may begin terminating processes in the group based on other criteria related to the management of memory. For examples, the low-memory manager may begin terminating processes in the group based on memory usage alone. In such examples, the low-memory manager would typically terminate a main process first as the main process usually uses the most memory in the group. As a result, each of the child processes dependent on the main process would also be terminated.

In overview, aspects of the present disclosure include systems and methods related to low-memory management strategies. Specifically, a processor executing a process management service may implement one or more low-memory mitigation processes for a group of processes to manage the determination of which processes in a group of processes should be terminated before other processes in the group while operating in the background. In such embodiments, the process management service may adjust the importance levels assigned to one or more of the processes to affect the likelihood or the order in which a low-memory manager operating on the computing device terminates the processes. In some embodiments, the process management service may cause a processor to additionally (or alternatively) replace the main process in the group of processes with a smaller, stub process, such as while the group of processes is operating in the background. By utilizing the stub process rather than the main process, the group of processes may have a decreased likelihood that the low-memory manager terminates the entire group of processes, especially while the group of processes operates in the background.

Generally described, when the group of processes transitions to the background, the importance level associated with those processes is lowered (e.g., to the "background" importance level). While operating in the background, the group of processes may have access to a relatively smaller amount of memory due to their lower importance. As a result, one or more of the processes in the group may be at a higher risk of being terminated if they use too much memory. In order to decrease the likelihood that at least one of the processes in the group will not be terminated in the background, the process management service may implement a low-memory mitigation process for the group of processes in part by assigning importance levels to processes in the group based on an estimated background memory threshold. Specifically, the process management service may select one or more processes in the group such that the selected processes are expected to use less than the estimated threshold amount of memory. The process management service may then lower the importance level of other processes in the group that were not selected (sometimes referred to as "non-selected processes") and may, optionally, increase the importance level of the selected processes. As a result, in the event that the low-memory manager begins terminating processes, the low-memory manager is more likely to free a sufficient amount of memory by merely terminating one or more of the non-selected processes, thereby decreasing the likelihood that the selected processes will also be terminated. For example, the process management service may select a main process in the group to have a higher importance level, thereby reducing the risk that the main process (and all processes dependent on the main process) will be terminated.

Further, the process management service may determine whether one or more of the selected processes survived operating in the background. Specifically, in the event that all of the selected processes survive operating in the background, the estimated background memory threshold may have underrepresented the amount of memory that was actually available for the group of processes in the background. In response, the process management service may increase the estimate of the available background memory the next time the group of processes transitions to the background. By increasing the estimate, the process management service may select more or different processes. However, in the event that one or more of the selected processes are terminated in the background, the estimated background memory threshold may have overrepresented the amount of memory that was actually available for the group of processes in the background. In response, the process management service may use a lower background memory threshold the next time the group of processes transitions to the background. At that time, the process management service may be able to select fewer processes or a different combination of processes.

In some embodiments, the process management service may implement a low-memory mitigation process for a group of related processes by dynamically adjusting the importance level of processes in the group, such as while the group of processes is operating in the background. In such embodiments, the process management service may determine a priority order for the processes in the group, assign one or more low-priority processes to a low importance level, and assign the remaining processes to a standard importance level. In some embodiments, the process management service may extend the range of importance levels available for use with the group of process, for instance, by raising the importance level of one or more processes in the group to an elevated importance level to which the group of processes may not ordinarily have access. The process management service may monitor processes assigned to comparatively lower importance levels to determine whether those processes have been or are likely to be terminated. In the event that no processes assigned to the lower-importance level are terminated, there may be sufficient memory on the computing device for all applications. In such cases, the process management service may not need to modify the importance levels of any of the processes in the group. However, if one or more processes assigned to the lower-importance level are terminated, there may be low or insufficient memory for more important applications operating on the computing device. As a result, the process management service may reassign other processes in the group to a lower importance level to replace processes that were terminated. Thus, the processes management service may decrease the likelihood that higher-priority processes will be terminated by ensuring that the low-memory manager terminates lower-priority processes before higher-priority processes, if the computing device continues to experience low memory.

In some embodiments, the process management service may implement a low-memory mitigation process for a group of processes by replacing the main process in the group with a stub process as noted above. The stub process may have no or limited functionality and may require substantially less memory than the main process. The process management service may transfer the process handles and other identifying information needed to maintain the child processes from the main process to the stub process. Subsequent to transferring the process handles to the stub process, the process management service may terminate the main process. As the stub process uses less memory than the main memory, the stub process may have a low likelihood of being terminated relative to the likelihood that the main process would have been terminated. As a result, there is an overall lower likelihood that the entire group of processes will be terminated as a group. Further, once the group of processes transitions out of the background (e.g., back into the foreground), the group of processes may be assigned to higher importance levels and, thus, may be less likely to be terminated. As a result, the process management service may restart the main process, transfer process handles of the child processes back to the main process, and terminate the stub process.

In various embodiments, the process management service may prioritize the group of related processes based on various factors that may render one or more processes more important or "valuable" than other processes. These factors may reflect various conditions or properties of the computing device, as well as the processes themselves. As such, in various embodiments described herein, references to a "higher-priority" or a "lower-priority" process may reflect a determination regarding the cost and other value of the process relative to other processes in the group of processes.

In one example, the relative priority of a process in the group may be based at least in part on considerations regarding the "cost" or "costs" of replacing the process in the event the process is terminated. The costs of replacing a process may include, among other factors, an expected amount of time to replace the process (e.g., an expected amount of time needed to retrieve resources for the process from a network), an expected amount of processing power to replace the process, an estimated amount of battery power needed to replace the process, and other resources that may be expended on the computing device to restart the process. Other costs may include monetary costs to request and receive resources from the network that are needed to replace the terminated process, such as the monetary costs of network communications given a data plan associated with the computing device (e.g., a 4G data plan with monthly data caps or communications while in a roaming network).

In some embodiments, a cost of replacing a process may also include an estimate of the amount of "phantom" memory that may also be required when replacing the process. In an example, a cost of replacing a process may include the amount of memory resources needed to run the process, as well as an amount of "phantom" memory used by another process (e.g., an OpenGL driver) that may not be used by the process but may nonetheless be required for the process to execute as expected. In such embodiments, the cost of replacing a process may factor in this amount of "phantom" memory used by another process.

Additionally (or alternatively), costs may include a calculation or determination related to an amount of resources needed to replace the process that may be acquired from a local cache. In such embodiments, fewer processing or network resources may be required to replace a process in the event that some or most of the process's resources (e.g., related images, stored data, etc.) are available in the local cache. On the other hand, replacing a process with resources obtained from sources other than a local cache (e.g., from a content provider over a network) may be associated with a higher cost as it may take more power, processing, and networking resources to obtain these resources.

In some embodiments, a cost of replacing a process may also or alternative reflect a cost of replacing processes that are dependent on the process to be replaced. Specifically, a total cost for replacing a process may include the costs of replacing the process itself, as well as any dependent processes that may also be terminated as a result. Examples of dependent processes may include a nested page inside of an iframe of a web page running in a browser application.

In some embodiments, the cost of replacing a process may include an amount of time required to serialize or store data associated with the process. As such, processes that may require a longer amount of time may be associated with a higher priority to enable those processes more time to store or serialize their data before being terminated.

Further, in determining a relatively priority of a process, the process management service may also (or alternatively) consider the impact of restarting the process on the user. For instance, a process associated with user profile data or other user data that may be difficult to replace without user intervention (e.g., form input data, cookie or other stateful information, game state information, etc.) may be particularly "costly" to replace as restarting the process may require the user to reenter data or other information. In an example, a process related to a page running in a browser application may be associated with a higher cost to replace to the user when the page was loaded in response to the user's submitting a form because the user may need to provide authorization to resubmit the form. In another, non-limiting example, a process related to a page running in a browser application may be relatively more costly to replace to the user in the event that the user has interacted with the page to a considerable degree—such as when playing a game—as measured by the number of input events related to the page versus an amount of time that the page has been visible. In another example, the computing device may receive a user input designating a certain application or process as a "favorite" application or process that the user may not want terminated, and this process may be associated with a higher cost than in the even the process were not a "favorite" process. In yet another example, a process associated with a page running in a browser application may be relatively more costly to replace with regard to the user when that page has been modified or amended using dynamic requests, such as one or more asynchronous requests for more content (e.g., AJAX requests).

As such, the relative costs of losing data particularly relevant to, used by, or useful to a customer may outweigh other costs, such as the time and resources needed to reload the process on the computing device. In some instances, these costs to the user may be inferred based on the user's use of the application, for example, by monitoring for processes that are associated with user input, processes associated with frequent user interaction (e.g., frequent refreshes or reloading of a browser tab), etc. As such, the process management service may, in such embodiments, prioritize processes with high replacement costs relative to the user above processes with high replacement costs relative to the computing device.

For ease of description, each low-memory mitigation process (such as those described above) is primarily described in separate embodiments to emphasize certain details regarding each strategy. However, the low-memory mitigation processes are not mutually exclusive, and the process management service may implement two or more low-memory mitigation processes for a group of processes in concert to improve the overall likelihood that one or more of the processes in the group will not be terminated, for example, while operating in the background. As such, in embodiments in which the process management service implements two or more low-memory mitigation processes, the implementations of those low-memory mitigation processes may occur simultaneously, consecutively, or in any order that would be apparent to one of ordinary skill in the art.

The various embodiments will be described in detail with reference to the accompanying drawings. Wherever possible, the same reference numbers will be used throughout the drawings to refer to the same or like parts. References made to the particular examples and implementations are for illustrative purposes, and are not intended to limit the scope of the invention or the claims.

FIG. 1 is a functional block diagram of an illustrative system 100 suitable for implementing some aspects of the present disclosure. The system 100 may include a computing device 102a and may include one or more optional computing devices 102b, which may be similar to or different from the computing device 102a. The computing device 102a and the one or more optional computing devices 102b may each communicate with a server 118 by exchanging data and other information via one or more networks, such as the network 114. Those skilled in the art will recognize that the computing devices 102a, 102b may be any of a number of computing devices that are capable of communicating over a network including, but not limited to, a laptop, personal computer, personal digital assistant (PDA), hybrid PDA/mobile phone, mobile phone, smartphone, wearable computing device, electronic book reader, digital media player, tablet computer, gaming console or controller, kiosk, augmented reality device, other wireless device, set-top or other television box, and the like.

In the example illustrated in FIG. 1, the computing device 102a may be directly connected to the network 114 via a wired connection 110 or may be in communication with a base station 106 via a wireless or cellular connection 108. The base station 106 may, in turn, be in communication with the network 114 via a wired connection 111. Similarly, the one or more optional computing devices 102b may be in communication with the network 114 via a wired connection 112 and/or may be in communication with the base station 106 via a wireless or cellular connection 104. The network 114 may exchange data and information between the server 118 and computing device 102a (and/or the optional computing devices 102) via a wired connection 116.

The network 114 may be any wired network, wireless network, or combination thereof. In addition, the network 114 may be a personal area network, local area network, wide area network, cable network, satellite network, cellular telephone network, etc. or combination thereof. In addition, the network 114 may be a personal area network, local area network, wide area network, over-the-air broadcast network (e.g., for radio or television), cable network, satellite network, cellular telephone network, or combination thereof. For example, the network 114 may be a publicly accessible network of linked networks, possibly operated by various distinct parties, such as the Internet. In some embodiments, the network 114 may be private or semi-private networks, such as a corporate or university intranets. The network 114 may include one or more wireless networks, such as a Global System for Mobile Communications (GSM) network, a Code Division Multiple Access (CDMA) network, a Long Term Evolution (LTE) network, or some other type of wireless network. The network 114 may use protocols and components for communicating via the Internet or any of the other aforementioned types of networks. Protocols and components for communicating via the Internet or any of the other aforementioned types of communication networks are well known to those skilled in the art and, thus, are not described in more detail herein.

In some embodiments, the server 118 may include a network browser service 120, which may work in concert with a browser application operating on the computing devices 102a, 102b (e.g., a browser application 218 operating on the computing device 102a as described with reference to FIG. 2) to perform various supplemental functions, such as analyzing aggregate web traffic patterns received from the computing devices 102a, 102b, preprocessing web pages for rendering on the computing devices 102a, 102b, and applying predictive algorithms to quickly deliver content to the computing devices 102a, 102b. These and other functions may be implemented by a processing unit 122 included in the network browser service 120 that is configured to execute a network browser application 126. The network browser service 120 may also include a network interface component 124 for receiving browser data from and sending browser data to the computing devices 102a, 102b over the network 114.

In some embodiments, the network browser service 120 may be implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" computing environment.

The network browser service 120 may receive information regarding low-memory mitigation processes that have been implemented on various computing devices, such as the computing devices 102a, 102b. For example, the network browser service 120 may collect information regarding the identities of groups of processes operating on the computing devices 102a, 102b at the time the survival strategies were implemented, the results of implementing the strategies (e.g., whether processes in those groups were terminated or survived), the battery level at the time of implementation of the strategies, identities of other applications running at the same time, and various other information regarding the circumstances and contexts in which the low-memory mitigation processes were implemented on those devices. The network browser service 120 may analyze this "crowd-sourced" information to identify situations in which the implementation of low-memory mitigation processes proved to be more or less successful. For example, the network browser service 120 may determine that utilizing a certain background memory threshold is more likely to prevent unwanted process terminations on computing devices having a certain combination of applications, capabilities, capacities, components, etc. (e.g., a certain maximum available memory).

The network browser service 120 may store raw or processed data regarding the implementation of various low-memory mitigation processes as a corpus of data in a data store 128 and may make some or all of this data available to the computing devices 102*a*, 102*b*. Particularly, in some embodiments, the network browser service 120 may provide the crowd-sourced information to the computing devices 102*a*, 102*b* (e.g., in response to a request received from the computing devices 102*a*, 102*b*), and the computing devices 102*a*, 102*b* may utilize the received information in order to implement one or more low-memory mitigation processes. For example, the computing device 102*a* may send information about its current configuration and the processes currently operating on the computing device 102*a* to the network browser service 120, and in response, the network browser service 120 may send information to the computing device 102*a* regarding particular low-memory mitigation processes that have been successfully implemented on other computing devices with similar configurations.

Figure 2:
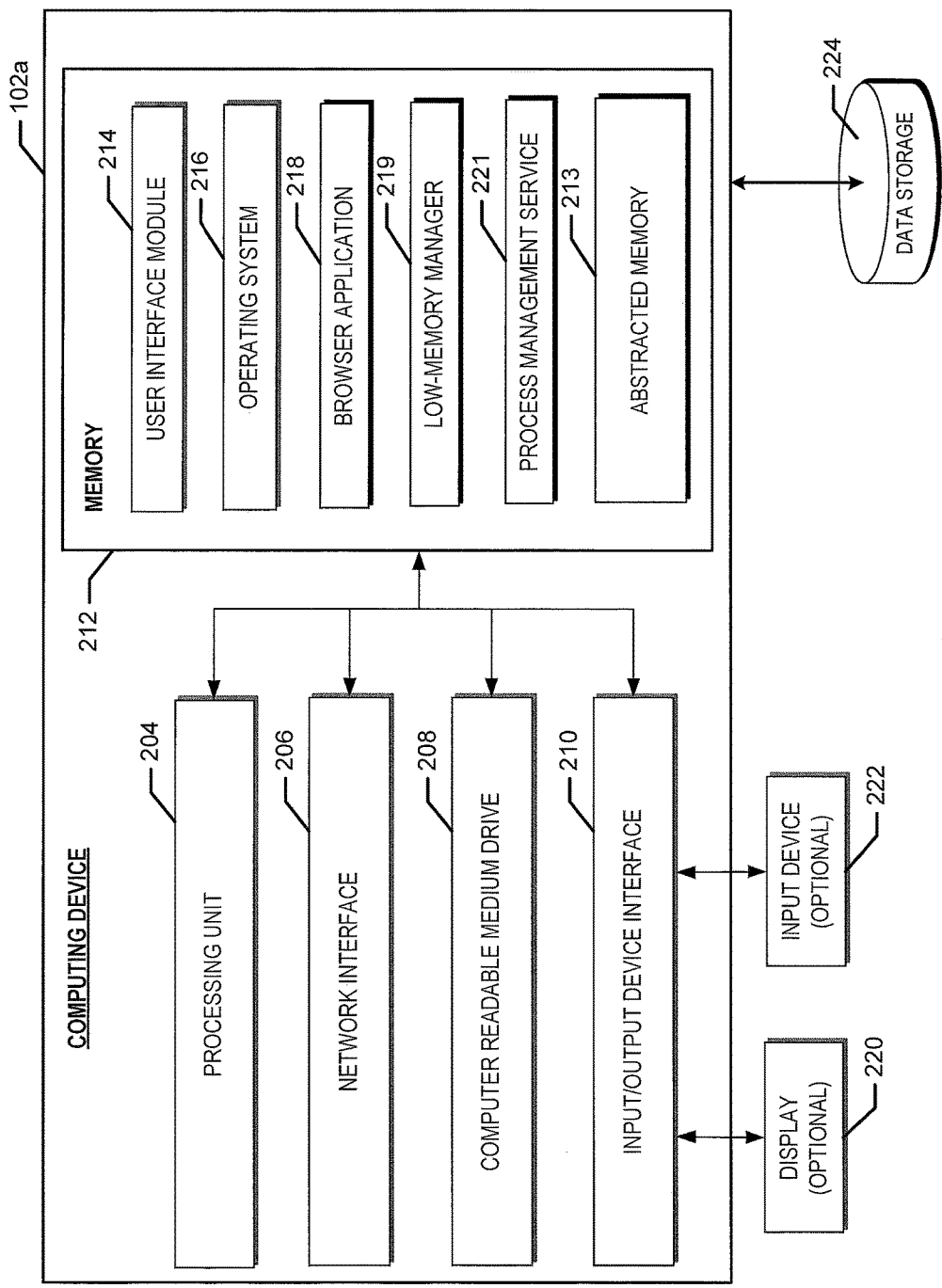
FIG. 2 is a component diagram of an example computing device suitable for use with various embodiments.

FIG. 2 depicts a general architecture of a computing device 102*a* configured to implement one or more low-memory mitigation processes, according to various embodiments. The general architecture of the computing device 102*a* depicted in FIG. 2 includes an arrangement of computer hardware and software components that may be used to implement aspects of the present disclosure. The computing device 102*a* may include many more (or fewer) elements than those shown in FIG. 2. It is not necessary, however, that all of these generally conventional elements be shown in order to provide an enabling disclosure. As illustrated, the computing device 102*a* includes a processing unit 204, a network interface 206, a computer readable medium drive 208, an input/output device interface 210, an optional display 220, and an optional input device 222, all of which may communicate with one another by way of a communication bus. The network interface 206 may provide connectivity to one or more networks or computing systems. For example, the processing unit 204 may receive and/or send information and instructions from/to other computing systems or services via one or more networks (e.g., a network 114 as described with reference to FIG. 1). The processing unit 204 may also communicate to and from a memory 212 and may further provide output information for the optional display 220 via the input/output device interface 210. The input/output device interface 210 may also accept input from the optional input device 222, such as a keyboard, mouse, digital pen, microphone, touch screen, gesture recognition system, voice recognition system, image recognition through an imaging device (which may capture eye, hand, head, body tracking data and/or placement), gamepad, accelerometer, gyroscope, or other input device known in the art.

The memory 212 may include computer- or processor-executable instructions (grouped as modules or components in some embodiments) that the processing unit 204 may execute in order to implement one or more embodiments. The memory 212 may generally include random-access memory ("RAM"), read-only memory ("ROM"), and/or other persistent, auxiliary, or non-transitory computer-readable media. The memory 212 may store an operating system 216 that provides computer program instructions for use by the processing unit 204 in the general administration and operation of the computing device 102*a*. The memory 212 may further include computer program instructions and other information for implementing aspects of the present disclosure. For example, in some embodiments, the memory 212 may include a user interface module 214 that generates user interfaces (and/or instructions therefor) for display upon the computing device 102*a* (e.g., on the optional display 220). In addition, the memory 212 may communicate with an external data storage unit 224.

In some embodiments, the memory 212 may include a browser application 218, a low-memory manager 219, and a process management service 221, each of which may be executed by the processing unit 204 to perform operations according to various embodiments. While the low-memory manager 219 is illustrated in FIG. 2 as a separate module stored in the memory 212, in some embodiments, the low-memory manager 219 may be included and/or implemented in the operating system 216, and as such, a separate memory manager 219 may not be required to implement various embodiments. Further, for ease of description, various embodiments described herein refer to the browser application 218. However, various embodiments may be implemented with various applications, including, but not limited to, the browser application 218.

In some embodiments, the processing unit 204 may execute the browser application 218, and during execution, the browser application 218 may function or otherwise be associated with a group of processes. The group of processes may include a main process and one or more child processes that depend on the main process to function. In particular, the main process may generally manage the operations of the browser application 218, such as by handling resource requests to a resource server, drawing pages to the display, etc. A child process, in some examples, may correspond with a tab of the browser, such that each tab that is open in the browser may be associated with a distinct child process. As described above, the main process maintains handles and binding information used to identify and utilize each child process. In some embodiments, the child processes may be terminated in response to the termination of the main process because the binding information for the child processes is lost when the main process is terminated. Additionally, the main process of the browsing application 218 may require a comparatively larger amount of memory to operate than child processes to facilitate its comparatively larger number of functions, state information, etc.

The memory 214 may include one or more pools of memory made available to the browser application 218, as well as various other applications or modules stored in the memory 212 and executed on the computing device 102*a*. For example, such a pool of available memory may include abstracted memory 213. The abstracted memory 213 may support the memory needs of the browser application 218 and one or more other applications operating on the computing device 102. As a result, the browser application 218 and the one or more applications (not shown) may have nontrivial memory interdependencies such that each application may perform cross memory consumption of the abstract memory 213, which may be a finite memory resource. In such embodiments, it may be impossible for the browser application 218, the operating system 216, or another application to determine or estimate an amount of memory in the abstracted memory 213 (or in the memory 212, generally) that is currently available for use with any practical accuracy. Thus, no component operating on the computing device 102*a* may be unable to reliably determine (or estimate) an amount of memory that is available the computing device 102*a*. As a result, the process management service 221, the operating system 216, and other components of the computing device 102a may be unable to anticipate at any given time how much memory is associated with a process or how much memory can be freed by terminating that process.

In light of the uncertainty regarding memory that is available on the computing device 102, the processing unit 204 may execute the process management service 221 to implement one or more low-memory mitigation processes for a group of processes. In particular, the process management service 221 may estimate and implement a background memory threshold for a group of processes related to the browser application 218, and the process management service 221 may assign importance level to particular services based on the estimated background memory threshold (e.g., as described with reference to FIGS. 4-7). In some embodiments, the process management service 221 may dynamically adjust priorities of processes in a group of processes operating in the background in order to influence the order in which the memory manager 219 terminates those processes such that higher-priority processes in the group have a lower likelihood of being terminated (e.g., as described with reference to FIGS. 8-10). Additionally (or alternatively), the process management service 221 may temporarily replace a main process in the group of processes with a stub process having a comparatively smaller memory requirement in order to reduce the likelihood that the memory manager 219 will terminate the entire group of processes in the background (e.g., as described with reference to FIGS. 11-13. In various embodiments, the process management service 221 may adjust or assign an importance level to a process by modifying service bindings maintained by the operating system 216 or by utilizing other system-level calls/functions.

While the process management service 221 is illustrated as a distinct module in the memory 212, in some embodiments, the process management service 221 may be incorporated as a module in the browser application 218 or another application, and as such, a separate memory manager 219 may not be required to implement various embodiments. In embodiments in which the process management service 221 is implemented as a module within the browser application 218, the process management service 221 may be able to determine the memory usage of processes related to the browser application 218, but may be unable to determine memory used by other applications, as noted above. In such embodiments, the process management service 221 may estimate the amount of memory that is actually available on the computing device 102a for use in implementing various low-memory mitigation processes for a group of processes, as further described below.

Further, in some embodiments, the above description of the computing device 102a may also be applied to various other computing devices, such as the one or more optional computing devices 102b. In such embodiments, the one or more computing devices 102b may include the components discussed above and may be configured to perform operations described with reference to the various embodiments.

Figure 3:
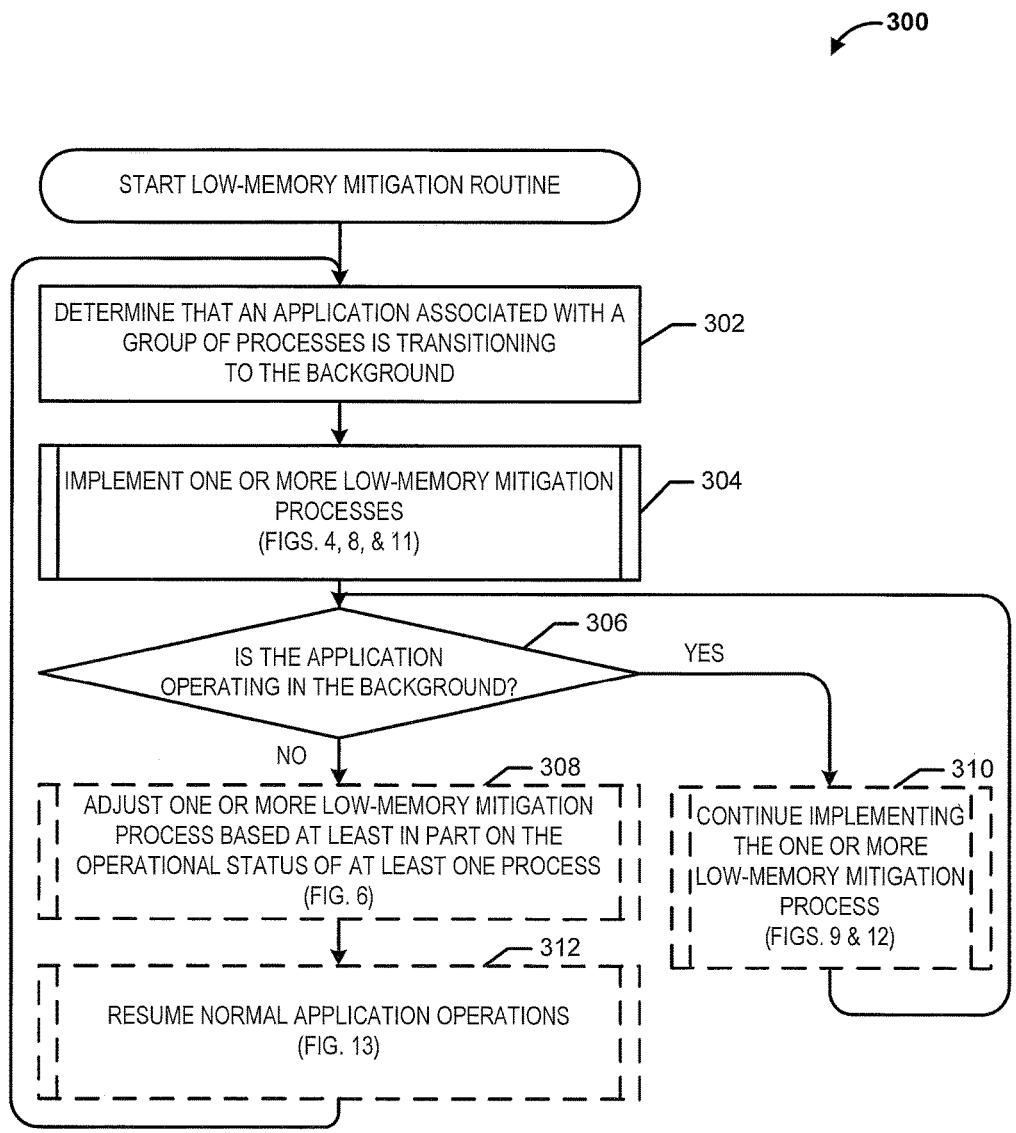
FIG. 3 is a process flow diagram illustrating a computer-implemented method for implementing one or more low-memory mitigation processes, according to some embodiments.

FIG. 3 is a process flow diagram of an illustrative routine 300 for implementing one or more low-memory mitigation processes for a set of linked processes or a group of related processes with a process management service to decrease the likelihood that one or more processes in the group will be terminated, such as while operating in the background, according to various embodiments. In some embodiments, the routine 300 may be implemented by a processor executing a process management service on a computing device (e.g., the process management service 221 of the computing device 102a as described with reference to FIG. 2).

With reference to FIG. 3, the process management service 221 may determine that an application associated with a group of processes is transitioning (or is about to transition) to the background state at block 302, such as by receiving an indication from an operating system application running on the computing device. In some embodiments, the application may transition to the background state in response to a user input that minimizes, hides, or otherwise takes focus away from the application. For example, the operating system 216 may send the browser application 218 to the background in response to receiving a user input that starts another application that is brought to the foreground.

When the application is moved to the background, the importance level of each process in the group is lowered (e.g., to the "background" importance level). In the background, the main process is often the first process terminated in the group of processes due to the relatively large amount of memory that the main process utilizes. However, when the main process is terminated, the child processes are also terminated because the main process manages the child processes' bindings, handles, and other identifiers needed for those child processes to continue operating. Further, even in the event that the entire group of processes is not terminated together, the low-memory manager may not consider the relative priority of each process in the group, and thus may begin terminating processes in the group based merely on their respective memory usage. Thus, to decrease the likelihood that one or more higher-priority processes in the group are terminated in the background, the process management service may implement one or more low-memory mitigation processes for the group of processes, at block 304. In some embodiments, the process management service 221 may change the importance level associated with one or more of these processes to affect the order in which the processes in the group are terminated by the low-memory manager 219. Specifically, in the event that the low-memory manager 219 needs to free memory, the process management service 221 may lower the importance of one or more processes in the group that have the lowest priorities in the group, thereby causing the low-memory manager 219 to terminate those lower-priority processes before other processes in the group, if necessary.

In some embodiments, at block 304, the process management service 221 may estimate a background memory threshold, which may correspond with an estimate of a maximum amount of memory that the group of processes may utilize while operating in the background. In view of this estimated background memory threshold, the process management service 221 may select one or more processes in the group such that the one or more selected processes will utilize an amount of memory that does not exceed the estimated background memory threshold while operating in the background. The process management service 221 may then lower the importance level of other processes in the group that were not selected (and/or raise the importance level of the selected processes), thereby causing the low-memory manager 219 to terminate those non-selected processes before the selected processes in the event that more memory is needed on the computing device. By prioritizing processes in the group based on the estimated background memory threshold, the process management service 221 may decrease the likelihood that higher priority processes (e.g., the main process or child processes associated with tabs that are storing hard-to-replace user input data) will be terminated in the background because the low-memory manager 219 may be able to free a sufficient amount of memory merely by terminating one or more of the non-selected processes. Estimating a background memory threshold and using that threshold to adjust the importance level of processes in the group is further described with reference to FIG. 4.

In some additional (or alternative) embodiments, at block 304, the process management service 221 may adjust the importance level of processes in the group while operating in the background in order to control the order in which the processes in the group are terminated. In such embodiments, the process management service 221 may determine a priority order for the processes in the group, assign one or more low-priority processes to a low importance level, and assign the remaining processes to a standard importance level. For example, the lowest priority processes may be assigned to the "cached" importance level, while the remaining processes may remain in the standard/default "background" importance level, which is higher in the importance hierarchy than the cached importance level. In some embodiments, the process management service 221 may also assign one or more high-priority processes (e.g., the main process) to an elevated importance level—such as a service or visible importance level—that is higher in the importance hierarchy than the background importance level and the cached importance level. In some instances, the elevated importance level may not be an importance level that would be available to the group of processes, and as such, the process management service 221 may expand the overall number of importance levels to which process in the group may be assigned. By assigning importance levels to the processes in the group based on their respective priority levels, the process management service 221 may indirectly set the order in which the low-memory manager 219 will terminate processes. As such, higher-priority processes in the group may have a decreased likelihood of being terminated as the low-memory manager 219 may be able to free a sufficient amount of memory by terminating lower-priority processes. Determining a priority order for the processes and the groups and assigning the processes importance levels based on their respective priorities is described further with reference to FIG. 8.

In some embodiments of the operations performed at block 304, the process management service 221 may replace the main process in the group with a stub process. As noted above, the main process may require a comparatively large amount of memory, and as a result, the main process may be a prime target for the low-memory manager 219 to terminate in the event that available memory resources on the computing device are low. However, as also described, terminating the main process may result in termination of child processes dependent on the main process. To decrease the likelihood that the whole group of processes is terminated as a result of the low-memory manager 219's termination of the main process, the process management service 221 may replace the main process with a light-weight, stub process. The stub process may have no or limited functionality and may require substantially less memory than the main process. The process management service 221 may transfer process handles for maintaining the child processes from the main process to the stub process and may terminate the main process after the transfer is complete. As the stub process uses less memory, the stub process may have a low likelihood of being terminated, relative to the likelihood that the main process would have been terminated. Replacing/substituting a main process with a stub process as part of implementing a low-memory mitigation process is described further with reference to FIG. 11.

At decision block 306, the process management service 221 determines whether the application is operating (or still operating) in the background. Specifically, while the group of processes operates in the background, the processes may have an overall higher likelihood of being terminated because the processes are associated with a lower importance level while in the background. Thus, in response to determining that the application is operating (or still operating) in the background (i.e., decision block 306="YES"), the process management service 221 may optionally continue implementing the one or more low-memory mitigation processes in optional block 310 in order to continue decreasing (or maintaining) the likelihood that at least one process in the group will not be terminated while operating in the background.

In some embodiments in which the process management service 221 has assigned importance levels to processes in the group as part of implementing one or more low-survival strategies at block 304 (e.g., as described with reference to FIG. 8), the low process management service 221 may continue implementing such low-memory mitigation processes in optional block 310 by continuing to adjust the importance levels of the processes in response to determining that one or more of those processes has been terminated. Specifically, the process management service 221 may monitor processes assigned to comparatively lower importance levels to determine whether those processes have been or are likely to be terminated. In response to determining that one or more processes assigned to lower priorities level(s) have been or will be terminated, the process management service 221 may reassign other processes in the group to a lower importance level, thereby increasing the likelihood that the low-memory manager 219 will not need to terminate the higher-priority processes in the group. This process of dynamically "feeding" the low-memory manager 219 with low-priority process to preserve higher-priority processes is further described with reference to FIG. 9.

Additionally (or alternatively), in embodiments in which the process management service 221 has replaced a main process with a stub process as part of implementing a low-memory mitigation process at block 304, the stub process may be configured with limited or no functionality. Thus, while the group of processes is operating in the background, the process management service 221 may continue implementing this low-memory mitigation process in optional block 310 by forwarding data and other information intended for the stub process to a network-based browser application (e.g., the network browser application 126 of the network browser service 120 as described with reference to FIG. 1). By forwarding the data to the network-based browser application for processing, the process management service 221 may offload some of the responsibilities of the stub process that would have ordinarily been handled by the main process to the network-based browser application, thereby enabling the browser application 218 on the computing device to have some of the functionality of having the main process without having to support the main process's comparatively large memory needs. Forwarding data intended for the stub process is described further with reference to FIG. 12.

In some embodiments of the operations performed at optional block 310, the process management service 221 may continually adjust the importance levels of the processes in the group based on changes to their relative priorities. For example, the process management service 221 may initially determine that a process has a low priority and may assign the process to a low importance level. However, subsequent to assigning the low importance level to that process, the process management service 221 may determine that the priority of the process has increased (e.g., the process is now associated with user profile data or other hard-to-replace information), and as a result, the process management service 221 may determine another priority order of the group of processes based on the updated priority information and may adjust the importance levels of the processes to reflect the updated priority order. In an example, the process management service 221 may determine that a process will require a comparatively longer amount of time to store or serialize its data and thus may associate the process with a higher priority and importance level because the process may be unable to complete serializing or storing its data before being terminated if that process were assigning to a low importance level. However, once that process has stored or serialized its information, the process management service 221 may lower its priority as its data may be easily restored and may reassign the process to a lower importance level (and optionally may increase the importance level of another process that now has a comparatively higher priority).

Returning to decision block 306, in response to determining that the application is not operating (or no longer operating) in the background (i.e., decision block 306="NO"), the process management service 221 may optionally adjust the low-memory mitigation process (or strategies) implemented at block 304 based at least in part on the operational status of at least one process in the group of process, in optional block 308. Specifically, the process management service 221 may evaluate whether the strategy implemented at block 304 was successful at preventing the termination of one or more processes in the group or at least successful at preventing the termination of relatively higher-priority processes (e.g., described with reference to FIG. 6). For example, the process management service 221 may determine that the estimated background memory threshold utilized to assign importance levels to processes in the group led to the termination of all of the processes in the group. In this example, the processes management service may lower the estimated background memory threshold as the current estimate overestimated the actual amount of memory that was available for the group of processes in the background.

In some embodiments of the operations of block 308, the process management service 221 may periodically adjust the low-memory mitigation processes. For instance, in the above example, the process management service 221 may periodically increase or decrease the estimated background memory threshold to determine whether the amount of actual memory available to the processes has changed In optional block 312, the process management service 221 may resume normal application operations by rolling back changes made to the group of processes implemented as part of a low-memory mitigation process at block 304. For example (as further described with reference to FIG. 13), in optional block 312, the process management service 221 may restart the main process, transfer process handles of the child processes from the stub process to the main process, and terminate the stub process in response to creating a stub process.

The process management service 221 may continue performing the routine 300 by again determining that an application associated with a group of processes is transitioning (or about to transition to) the background at block 302. As such, the operations of the routine 300 may be performed in a loop any number of times.

Figure 4:
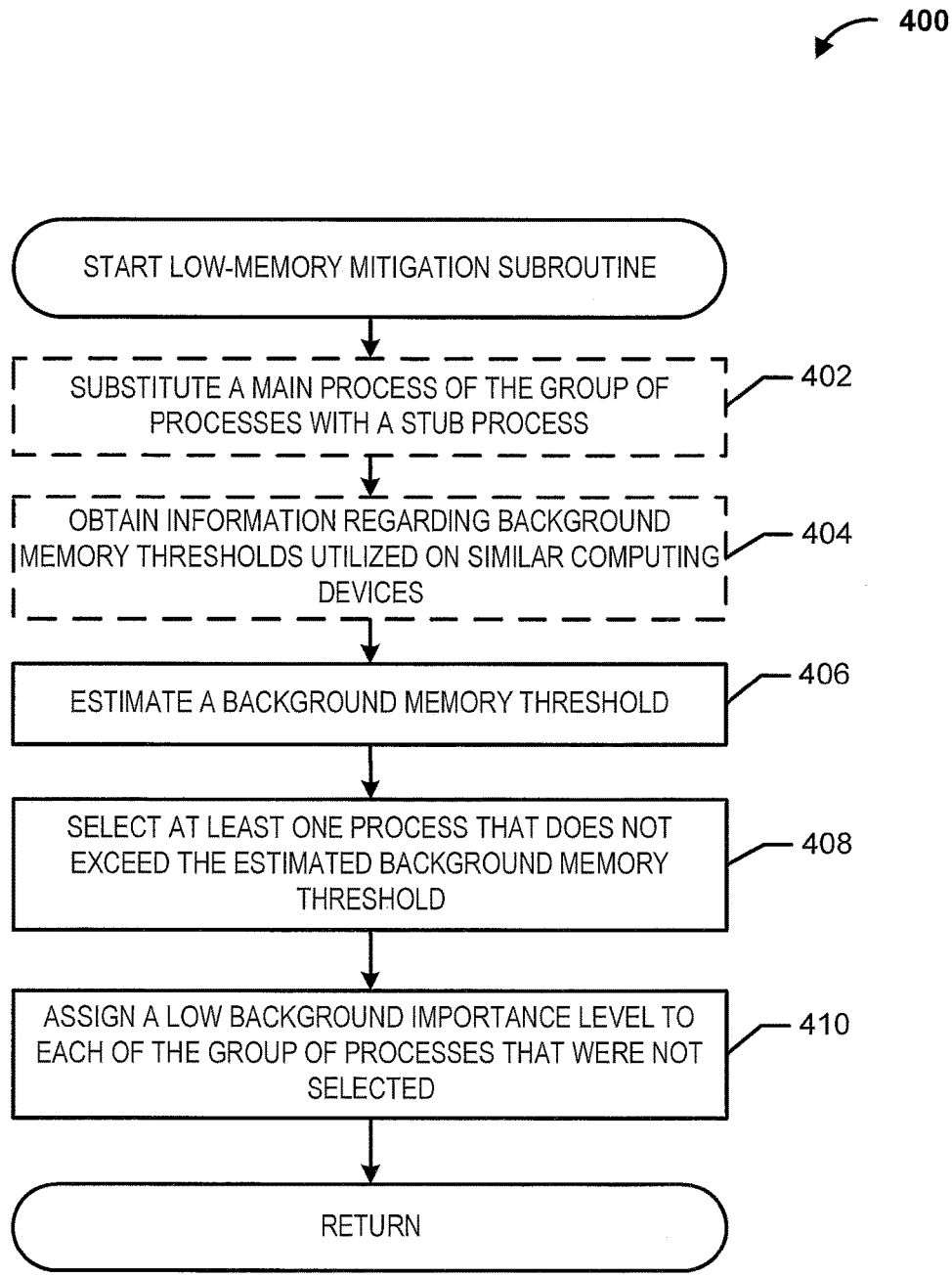
FIG. 4 is a process flow diagram illustrating a computer-implemented method for assigning a low background importance level to one or more processes of a browser application based on an estimated background memory threshold, according to some embodiments.

FIG. 4 is a process flow diagram of an illustrative subroutine 400 for estimating a background memory threshold and assigning one or more processes in a group of processes to importance levels based on the estimated background memory threshold, according to some embodiments. Subroutine 400 may be implemented with a process management service operating on a computing device (e.g., the process management service 221 of the computing device 102*a* as described with reference to FIG. 2). The subroutine 400 implements an embodiment of the operations of block 304 of the routine 300 as described with reference to FIG. 3.

In optional block 402, the process management service 221 may substitute a main process of the group of processes with a stub process to avoid losing the entire group of processes if the main process is terminated, as further described below with reference to FIG. 11. In some embodiments, the process management service 221 may initiate the creation of the stub process, such as making a process start call to the operating system 216.

In optional block 404, the process management service 221 may obtain information regarding background memory thresholds utilized on computing devices having configurations, capabilities, or installed applications similar to those of the computing device on which the process management service 221 is operating. In such embodiments, the process management service 221 may receive the information via a network interface (e.g., the network interface 206), which may in turn receive the information from a server in communication with numerous computing devices (e.g., the network browser service 120 of the server 118 as described with reference to FIG. 2). In some embodiments, updated information regarding background memory thresholds may be periodically received from the server 118, and the process management service 221 may obtain the latest or most up-to-date information while performing operations at optional block 404. In some other embodiments, the information may have been directly loaded into the memory 212 of the computing device 102*a* (e.g., by an original equipment manufacturer).

At block 406, the process management service 221 estimates a background memory threshold. In some embodiments, the process management service 221 may estimate the background memory threshold based at least in part on resources that the service can currently monitor reliably, such as internal compositor memory usage and count/types of resources related to each process.

In some embodiments of the operations performed at block 406, the process management service 221 may estimate the background memory threshold without using information regarding an amount of memory that is available on the computing device 102*a*. In some instances, estimating the background memory threshold without using information regarding an amount of memory may include estimating the background memory threshold without receiving such information. In some other instances, estimating the background memory threshold without using information regarding an amount of memory may include receiving and ignoring memory regarding an amount of memory on the computing device. As described above, due to the non-trivial memory interdependencies of processes and applications operating on the computing device 102*a*, the process management service 221 and other components on the computing device 102*a* (e.g., the operating system 216) may be unable to determine, contemporaneously, an amount of memory that is actually available on the computing device 102a or how much memory may be freed by terminating a process or application. As a result, the process management service 221 may not have access to the amount of memory utilized by other applications operating on the computing device and thus may estimate the background memory threshold based only on the memory usage of the group of processes. Thus, in an example, the process management service 221 may initially estimate the background memory usage as half of the total memory utilized by the group of processes. In some embodiments, the process management service 221 may receive information regarding an amount of memory available on the computing device, such as from the operating system 216. However, as noted above, the information received from the operating system 216 may be inaccurate as no component on the computing device 102a may be able to accurately determine the memory available on computing device 102a, and in such instances, the process management service 221 may discard or ignore the information received from the operating system 216.

In embodiments in which the process management service 221 receives information from the server in optional block 404, the process management service 221 may also (or alternatively) estimate the background memory threshold at block 406 at least in part based on the received information. For example, the information received from the server may indicate that similarly configured computing devices successfully avoided termination of certain processes based on a particular value of the estimated background memory threshold.

At block 408, the process management service 221 selects at least one of the group of processes that does not exceed the estimated background memory threshold. In particular, the process management service 221 may determine or estimate a memory usage for each of the group of processes and may select a subset of the group of processes such that a total estimated memory usage for the subset of selected processes does not exceed the background memory threshold estimated at block 406. In the above example, the process management service 221 may select a subset of processes such that the total memory usage of the subset of process does not exceed half of the total memory usage of the group of processes.

In some embodiments, the process management service 221 may determine a priority order for the one or more processes based on various criteria related to a relative priority of each of the processes. For example, the process management service 221 may identify the processes of the browser application 218 most likely to be important to the user, such as the processes associated with tabs or loaded pages storing user input (which, if lost, would require the user to re-input that data), processes that were recently used by the user, etc. The process management service 221 may additionally (or alternatively) determine an overall "cost" of replacing the processes and may derive the processes' relative importance based on each process's associated cost of replacement. In such embodiments, by determining the cost of replacement, the process management service 221 may identify those processes in the group of processes that require comparatively more resources to replace in the event that the low-memory manager 219 terminates those processes in the background. As such, the process management service 221 may attempt to decrease the likelihood that the low-memory manager 219 will terminate these "more costly" services, as further discussed herein.

At block 410, the process management service 221 assigns a low (or lower) background importance level to each of the group of processes that were not selected at block 408, thereby decreasing the likelihood that the low-memory manager 219 will terminate the selected processes. For example, in the event that the low-memory manager 219 needs to free memory for applications operating in the foreground, the low-memory manager 219 will begin terminating the processes that were not selected before terminating the processes in the subset selected at block 408. Thus, the selected processes may continue operating on occasions in which the low-memory manager 219 is able to free a sufficient amount of memory by merely terminating one or more non-selected processes. Further, in some embodiments in which the low-memory manager terminates (or causes termination of) every process in an importance level simultaneously, the process management service 221 may lower the overall risk that the processes that were selected (e.g., higher priority processes) will be terminated because the low-memory manager 219 may terminate all of the (or multiple) processes that were not selected and that were assigned to the lower importance level without needing to terminate the processes that were selected.

In some embodiments of the operations performed at blocks 406, 408, the process management service 221 may adjust the estimate of the background memory threshold based on the power level of the computing device. Replacing/reloading processes in the group may require a considerable amount of battery power. Thus, the process management service 221 may artificially lower the estimated background memory threshold, which may reduce the number of processes that can "fit" into the lower estimate. Thus, while fewer processes may be selected, those processes that are selected may have a higher likelihood of surviving in the background.

Similarly, the process management service 221 may also (or alternatively) adjust the estimation of the background memory threshold at block 406 and the selection of a subset of process at block 408 based on the current network connectivity of the computing device 102a. Specifically, in instances in which the computing device 102a has a network connectivity below a threshold network connectivity (e.g., a certain low connection speed), the process management service 221 may lower the background memory threshold service 221 as the low network connectivity may indicate that it may take longer to retrieve network resources (e.g., web data) needed to restart one or more processes in the group of processes. As such, the process management service 221 may utilize a more conservative estimate of the amount of memory that is available for the group of processes in order to increase the likelihood that the processes selected at block 408 will not be terminated. Further, in the event of low network connectivity, the process management service 221 may prioritize processes that will require more network resources in order to restart those proposes over other processes that may not require as much interaction with a network to restart.

In some optional embodiments (not shown), the process management service 221 may select a subset of processes at block 408 and assign importance levels at block 410 in response to determining that a triggering event has occurred. In such embodiments, the process management service 221 may monitor for an indication that the computing device 102a may be running low of memory and, in response to detecting such an indication, may perform the operations at blocks 408 and 410. The triggering events may include, for example, termination of a process in the group of processes, receiving a notification that a process in the group is about to be terminated, and/or receiving a general notification that the computing device 102a is running low on memory.

In some embodiments of the operations performed at block 408, the process management service 221 may receive a number of notifications (e.g., low-memory notifications) that the computing device 102a is running low on memory or that one or more of the processes in the group will be terminated. In response to determining that the number of received low-memory notifications exceeds a threshold number of notifications, the process management service 221 may decrease the estimated background threshold because more notifications may indicate that there may be less memory available for the group of processes. In particular, receiving more notifications may indicate that there will be a high likelihood that the low-memory manager will need to free a comparatively large number of processes, and the process management service 221 may decrease the estimated background memory threshold in order to select different and/or fewer processes at block 408 in order to increase the likelihood that those selected processes will survive in the background. On the other hand, the process management service 221 may increase the estimated background memory threshold in response to determining that a threshold number of low-memory notifications has not been received.

The process management service 221 may conclude performing the operations of the subroutine 400 by returning to block 304 of the routine 300 as described with reference to FIG. 3.

In some optional embodiments, the operations performed at blocks 404-410 may be performed by the process management service 221, the stub process, or a combination of both the process management service 221 and the stub process. For example, once the stub process has been substituted for the main process at block 402, the stub process may perform the various operations described with reference to blocks 404-410. As such, various operations described with reference to the process management service 221 may be implemented by or as part of the stub process.

FIG. 5A is a chart 500 illustrating memory usage of browser processes operating in the background on a computing device according to suboptimal implementations. Each process in a group of processes (e.g., processes 504-512) may utilize/require a certain amount of memory while operating in the background. In the example illustrated in FIG. 5A, the group of processes 504-512 are operating in the background and assigned to a standard background importance level, such as the "background" importance level. While the computing device has a sufficient amount of memory available for more important processes (e.g., represented in FIG. 5A as "Sufficient Memory"), the processes 504-512 continue to operate normally in the background. However, in the event that more memory is needed on the computing device (e.g., when the user launches a new application), the low-memory manager 219 may determine that the available memory on the computing device is low or insufficient (represented in FIG. 5A as "Low Memory"). As a result, the low-memory manager 219 will begin terminating the processes 504-512 to free up memory for the more important processes.

As described above, the low-memory manager 219 typically terminates processes from processes in the lowest importance level to processes in the highest importance level. Further, within each importance level, the low-memory manager 219 terminates processes that use more memory before those processes that use less memory. As illustrated in chart 500, each of the processes 504-512 is assigned to the same standard background importance level according to conventional implementations, and as a result, the low-memory manager 219 will first terminate the main process 512 because the main process 512 uses the most memory of the group of processes 504-512. As each of the child processes 504-510 depends on the main process 512 to operate, terminating the main process 512 results in the termination of the child processes 504-510. As a result, all of the data and information associated with each of the processes 504-512 in the group is lost, even though there may have been enough memory to keep some of the child processes alive.

FIG. 5B is a chart 550 illustrating an example of implementing a low-memory mitigation process, according to some embodiments, such as those described with reference to FIG. 4. Specifically, a process management service (e.g., the process management service 221 of the computing device 102a described with reference to FIG. 2) may estimate a total amount of memory that the group of processes 504-512 may utilize while in the background without being terminated by the low-memory manager 219. In the example illustrated in FIG. 5B, the process management service 221 may estimate that the processes 504-512 may utilize a total amount of memory represented by the estimated background memory threshold 514. Based on the estimated background memory threshold 514, the process management service 221 may determine an amount of memory that each of the processes 504-512 will require in the background and may select a subset of the processes 504-512 that will use an amount of memory that does not exceed the background memory threshold. For example, the process management service 221 may select the main process 512 and the second child process 506 because their combined memory usage in the background will not exceed the background memory threshold.

In some embodiments, the selection of processes may also be based on a priority of the processes, and the process management service 221 may attempt to select higher priority processes if those processes would "fit" within the estimated background memory threshold. For example, the process management service 221 may determine that the main process 512 is the most important process because the child processes 504-510 depend on the main process 512 to operate. As a result, the process management service 221 may include the main process 512 in the selected subset of processes. The process management service 221 may consider various other priority criteria, such as the type of information associated with each process (e.g., user form data), the cost of replacing or restarting each process, recent use of a process by the user, etc. In additional (or alternative) embodiments, the process management service 221 may also make the selection based on a certain number of processes such that the number of processes in the selected subset does not exceed that number of processes.

In response to selecting a subset of the processes 504-512 that satisfies the estimated background memory threshold 514, the process management service 221 may lower the importance level for each of the processes in the group that were not selected. Thus, in the example illustrated in FIG. 5B, the process management service 221 may lower the importance level of the child processes 504, 508, 510. In some embodiments (not shown), the process management service 221 may lower the importance levels just before the group of processes enters the background to avoid a situation in which the low-memory manager 219 immediately terminates the processes in the group.

In the event that the low-memory manager 219 determines that the computing device has low available memory (represented in FIG. 5B as "Low Memory"), the low-memory manager 219 may begin terminating the child processes 504, 508, 510 because of their lower importance level relative to the main process 512 and the second child process 506. If the estimate of the background memory threshold is accurate (or substantially accurate), the low-memory manager 219 may not need to terminate the main process 512 and the second child process 506 because a sufficient amount of memory may be freed by terminating one or more of the processes 504, 508, 510. Thus, by prioritizing and adjusting the importance levels of some of the processes, the process management service 221 may decrease the likelihood that higher priority processes (e.g., the main process 512) will be terminated while operating in the background.

Figure 6:
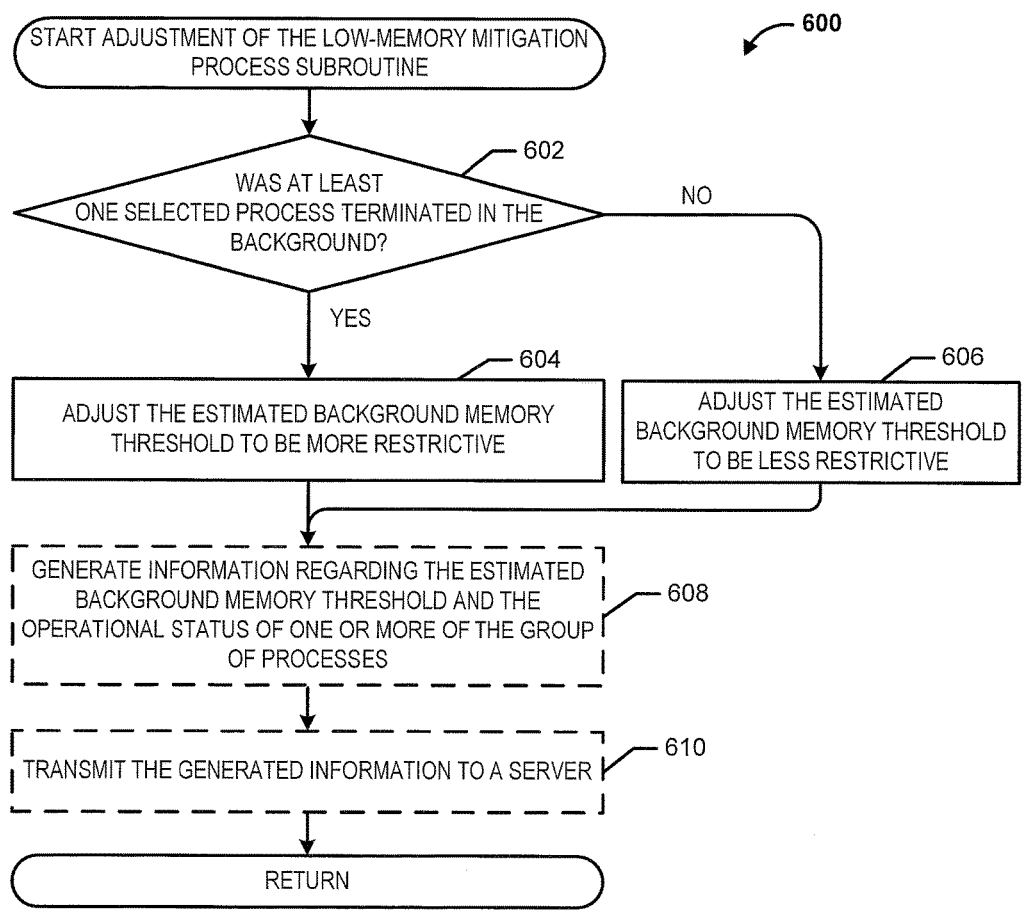
FIG. 6 is a process flow diagram illustrating a computer-implemented method for adjusting an estimated background memory threshold, according to some embodiments.

FIG. 6 is a process flow diagram of an illustrative subroutine 600 for adjusting a low-memory mitigation process, according to some embodiments. In some embodiments, the subroutine 600 may be implemented with a process management service operating on a computing device (e.g., the process management service 221 of the computing device 102a as described with reference to FIG. 2). The operations of the subroutine 600 implement embodiments of the operations of block 308 of the routine 300 as described with reference to FIG. 3.

As noted above, the process management service 221 (and various other components on the computing device 102) may be unable to directly assess the amount of memory that is actually available on the computing device. For example, some processes utilize shared memory with other processes or components of the computing device (e.g., the graphics driver of the operating system 216) or have non-trivial memory interdependencies with each other, and there may be no reliable way to determine how much of the shared memory is actually available. Further, while an application hosting a group of processes can query the operating system 216 to determine how much free memory is available, the application cannot know how much memory can be freed by killing other lower importance applications or processes, and as a result, asking the operating system 216 for the amount of free memory available on the computing device often does not provide a meaningful measure of memory that is actually available on the computing device.

Thus, in order to accurately estimate an amount of memory that will be available for the group of processes in the background, the process management service 221 may continually adjust the estimated background memory threshold based on the results of each previous estimate. In other words, the process management service 221 may determine an estimate for the background memory, utilize that estimate to select certain processes to have a higher importance level in the background, determine whether those selected processes were terminated in the background, and adjust the estimated background memory threshold based on whether the selected processes were terminated.

With reference to FIG. 6, the process management service 221 determines whether at least one selected process was terminated in the background in decision block 602. For example, the process management service 221 may poll the selected processes for response. In another example, the process service 221 may check a record of SIGKILL signals received from the low-memory manager 219. In response to determining that at least one selected process was terminated in the background (i.e., decision block 602="YES"), the process management service 221 adjusts the estimated background memory threshold to be more restrictive, at block 604. Specifically, the process management service 221 may determine that termination of one or more selected processes indicates that the current estimated background memory threshold was higher than the memory that was actually available for use by the selected processes. As a result, the low-memory manager 219 may have terminated all of the non-selected processes (associated with a comparatively lower importance level), as well as at least one selected process (associated with a higher importance level). The process management service 221 may reduce the estimated background memory threshold and utilize this reduced estimated background memory threshold in the future. For example, the process management service 221 may utilize the lower estimate the next time the process management service 221 selects processes at block 408 of the subroutine 400, such as the next time the application transitions to the background. In some embodiments, reducing the estimated background threshold may limit the process management service 221 to selecting a fewer number of processes and/or to select processes with an overall smaller memory usage in order to satisfy the reduced threshold.

In some embodiments, the process management service 221 may determine whether the processes that were terminated were terminated immediately upon entering the background or terminated at some later point while operating in the background. In such embodiments, the process management service 221 may reduce the estimated background memory threshold depending on the circumstances in which the processes were terminated. For example, the process management service 221 may reduce the estimate more in the event that the selected processes were terminated immediately upon entering background than in the event that the selected processes were terminated at some later point while operating in the background. In this example, evidence that the processes were terminated immediately may indicate that the estimate deviated significantly from the actual amount of memory available, whereas evidence that the processes were terminated over time may indicate that the estimate was not accurate but may have been close to reflecting the actual memory available on the computing device.

In response to determining that no selected process was terminated in the background (i.e., decision block 602="NO"), the process management service 221 adjusts the estimated background memory threshold to be less restrictive, at block 606. In particular, the process management service 221 may determine that the estimated background memory threshold may be raised because the estimate may have underrepresented the actual memory available to the group of processes. By raising the estimate, the process management service 221 may select more processes (or different processes) the next time the application transitions to the background, thereby decreasing the likelihood that those additional (or different) processes will be terminated in the background.

In some embodiments, the process management service 221 may adjust the estimated background memory threshold at block 604 or block 606 based at least in part on a number of low-memory notifications (e.g., general notifications of low memory on the computing device 102a or notifications that one or more processes in the group were terminated). For example, in response to determining that a threshold number of low-memory notifications was received, the process management service 221 may make a smaller adjustment to the estimated background memory threshold at block 606 because, while all of the selected subset of processes survived operating in the background, the large number of notifications may indicate that the estimated background memory threshold is close to the actual amount of available memory. On the other hand, in response to determining that a threshold number of low-memory notifications were not received, the process management service 221 may make a larger adjustment to the estimated background memory threshold at block 606 as the comparatively low number of notifications may indicate that the computing device is not likely running low on memory. Additionally (or alternatively), the process management service 221 may adjust the estimated background memory threshold at block 604 or block 606 based on one or more notifications that indicates a level of memory available (e.g., low, normal, high). Based on these one or more notifications, the process management service 221 may determine a particular probability or likelihood that there will be sufficient memory for the selected processes in the future. For example, a notification indicating a normal amount of memory may be associated with a higher likelihood that there will be sufficient memory, whereas a notification indicating a low amount of memory may indicate a lower likelihood. Similar operations may be performed at block 604 consistent with the above description.

In response to adjusting the estimated background memory in one of block 604 or 606, the device, the process management service 221 may optionally generate information regarding the estimated background memory threshold and the operational status of one or more of the group of processes, in optional block 608. As described, this information may indicate various characteristics of the computing device and processes, information regarding the original estimate of the memory available in the background, and information regarding how the original estimate was adjusted in light of the characteristics of the computing device and processes. This information may also include information regarding other applications that were operating while the processes were in the background, the power level of the computing device at that time, user profile data associated with the processes, etc.

In optional block 610, the process management service 221 may transmit the information generated in optional block 608 to a server, such as the server described with reference to block 404 of the subroutine 400 (see FIG. 4). In embodiments such as those described above, the server may compare the information transmitted in optional block 610 with similar information received from other computing devices to identify circumstances in which low-memory mitigation processes were successful (or not). The server may then share this crowd-sourced information with various computing device to enable them to intelligently implement low-memory mitigation processes.

The process management service 221 may conclude performing the operations of the subroutine 600 by returning to block 308 of the routine 300 as described with reference to FIG. 3.

Figure 7:
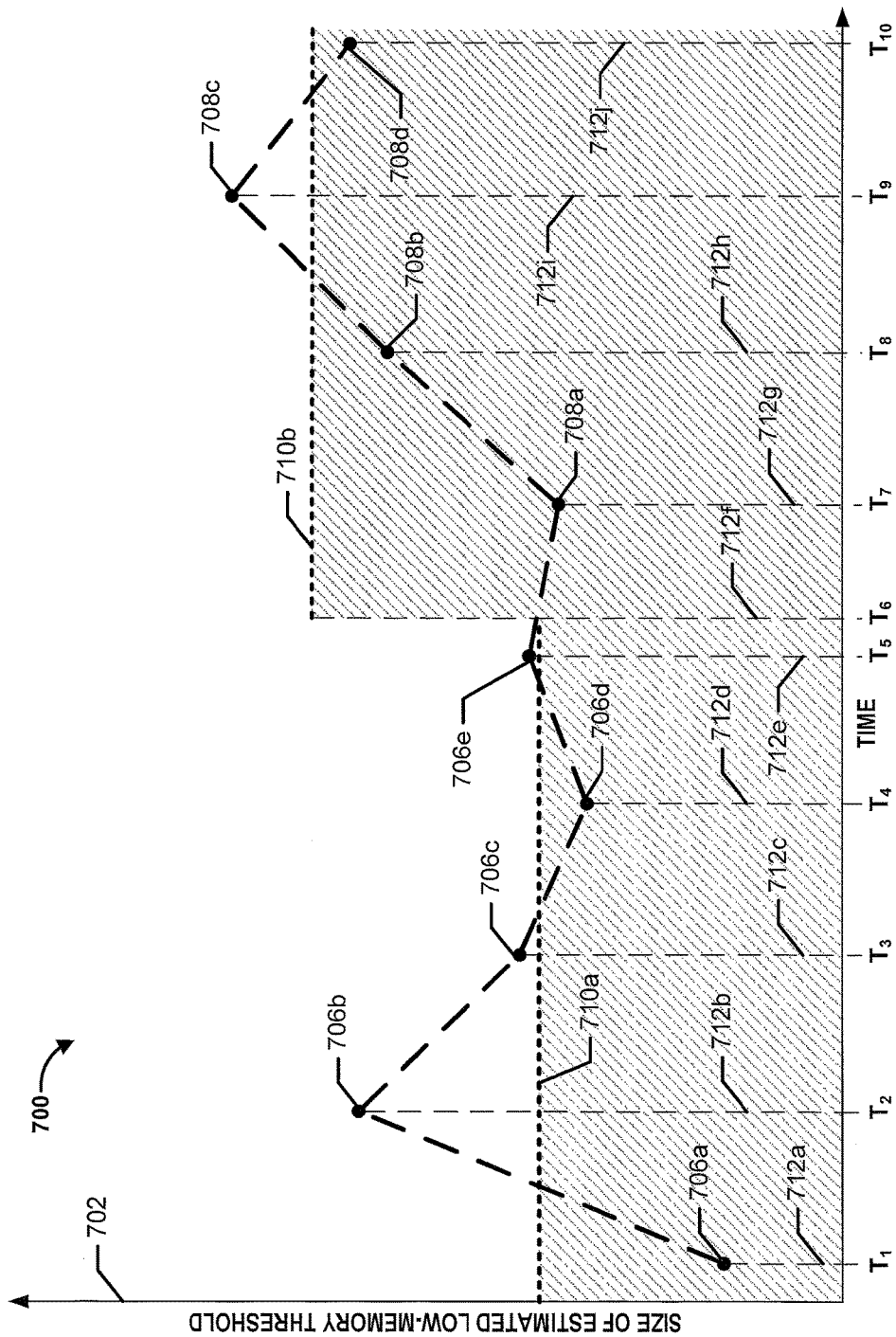
FIG. 7 is a chart illustrating adjusting an estimated background memory threshold over time, according to some embodiments.

FIG. 7 is a chart 700 illustrating an example of adjusting estimates of a background memory threshold over time, according to some embodiments, such as those described with reference to FIG. 6. An example of various estimates of the background memory threshold is illustrated in the chart 700. In this example, a process management service (e.g., the process management service 221 of the computing device 102*a* as described with reference to FIG. 2) may have utilized different estimated background memory thresholds 706*a*-706*e* and 708*a*-708*d* as part of implementing a low-memory mitigation process (see FIG. 3) at various times 712*a*-712*j* (illustrated in FIG. 7 as "$T_1$" through "$T_{10}$"), respectively. An estimated background memory threshold appearing at or above actual background memory thresholds 714*a*, 714*b* (e.g., in the non-shaded portion of the chart 700) may indicate that using that estimated background memory threshold resulted in the termination of one or more of selected processes in the background. On the other hand, an estimated background memory threshold appearing below the actual background memory thresholds 714*a*, 714*b* (e.g., in the shaded portion of the chart 700) may indicate using that estimated background memory threshold did not result in termination of any of the selected processes in the background.

In the example illustrated in the chart 700, the process management service 221 may have initially utilized an estimated background memory threshold 706*a*, which did not result in the termination of any selected processes. In response, the process management service 221 may have used a larger estimated background memory threshold 706*b* at the later time 712*b* in an attempt to more accurately estimate the actual background memory threshold 710*a*. However, because using the background memory threshold 706*b* may have resulted in the termination of one or more selected processes, the process management service 221 may use a smaller estimated background memory threshold 706*c* at the later time 712*c*. Similarly, because one or more selected processes were terminated by using the estimated background memory threshold 706*c*, the process management service 221 may utilize an even smaller estimated background memory threshold 706*d* at the later time 712*d*. Accordingly, the process management service 221 may continue adjusting the estimated background memory at the time 712*e*, as represented by the estimated background memory thresholds 706*e*.

At the time 712*f*, the available memory of the computing device may change, such as in response to an upgrade in memory capabilities, other new hardware, software updates, etc. In some embodiments, the process management service 221 may be unable to directly determine the amount of memory that is available on the computing device as described above. However, the process management service 221 may indirectly determine that a change in available memory has occurred by continuing to adjust the estimate background memory threshold as described above. Thus, as illustrated in the chart 700 after the time 712*f*, the process management service 221 may use an estimated background memory threshold 708*a* that is significantly below the actual background memory threshold 714*b* because the process management service 221 is unaware of the change in available memory on the computing device. However, because no selected processes were terminated by using the estimated background memory threshold 708*a*, the process management service 221 may use a larger estimated background memory threshold 708*b* at the later time 712*h*. Eventually, by continually adjusting the estimated background memory threshold over time—as represented by estimated background memory threshold 708*c*-708*d* at the times 712*i* and 712*j*—the process management service 221 may get progressively closer to estimating the actual background memory threshold 714*b* without having direct information regarding the amount of memory that is actually available on the computing device.

Figure 8:
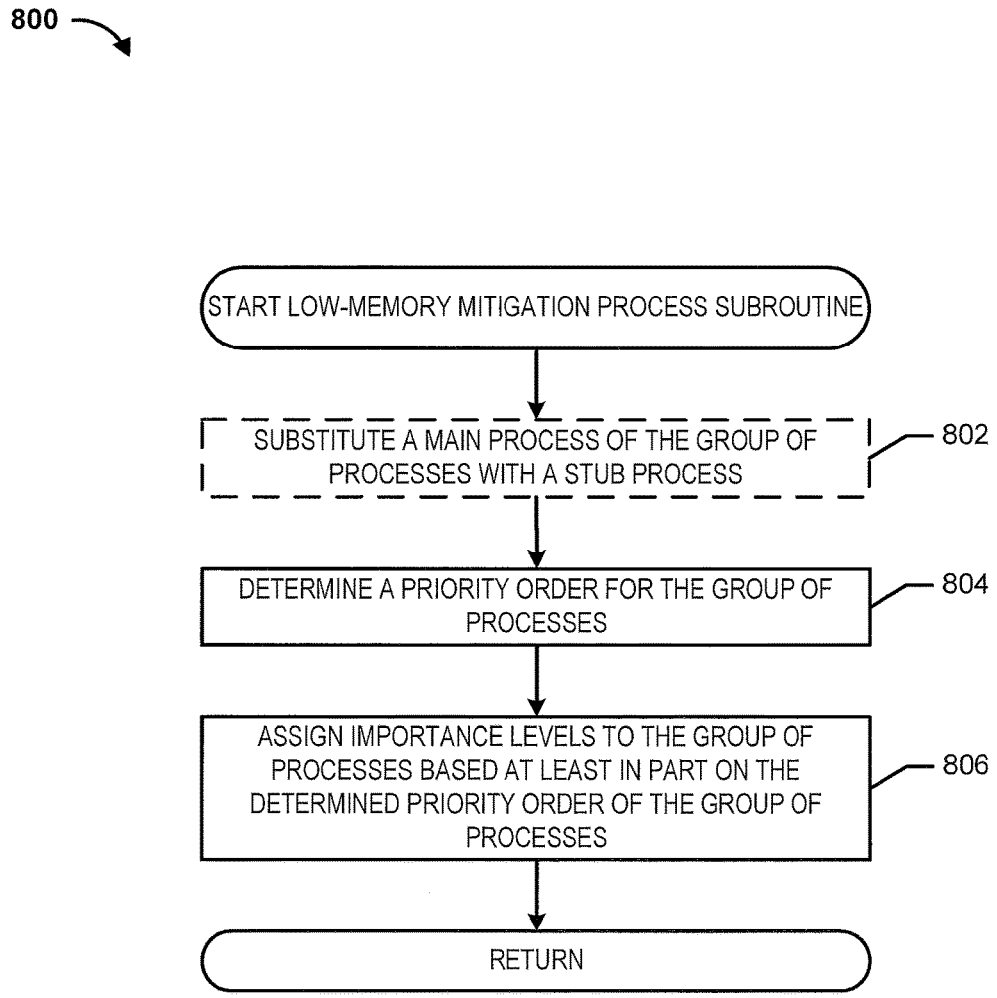
FIG. 8 is a process flow diagram illustrating a computer-implemented method for determining a priority order for a group of processes and assigning importance levels to a group of processes based the determined priority order, according to some embodiments.

FIG. 8 is a process flow diagram of an illustrative subroutine 800 for implementing a low-memory mitigation process by assigning low-importance levels to one or more processes in a group of processes based on the respective priorities of processes in the group, according to some embodiments. In some embodiments, the subroutine 800 may be implemented with a process management service operating on a computing device (e.g., the process management service 221 of the computing device 102*a* as described with reference to FIG. 2). The operations of the subroutine 800 implement an embodiment of the operations of block 304 of the routine 300 (e.g., as described with reference to FIG. 3). In such embodiments, the process management service 221 may begin performing the operations of the subroutine 800 in response to determining that an application is transitioning to the background at block 302 of the routine 300.

In optional block 802, the process management service 221 may optionally substitute a main process of the plurality of with a stub process, such as by creating a "placeholder" process that may manage connections to the child processes associated with the main process and terminating the main process. In some embodiments of the operations performed in optional block 802, the process management service 221 may perform operations similar to those operations described with reference to optional block 402 of the subroutine 400 (e.g., as described with reference to FIG. 4).

At block 804, the process management service 221 may determine a priority order for the group of processes. In some embodiments, the process management service 221 may determine or calculate a "cost" of replacing or reloading each of the processes. As noted above, the costs of replacing a process may include, among other factors, an expected amount of time needed to replace the process, an expected amount of processing power needed to replace the process, an expected amount of battery power needed to replace the process, whether the process is associated with hard-to-replace data (e.g., user form input or game state information), and various other criteria. The process management service 221 may also (or alternatively) use various other criteria to prioritize the processes, such as prioritizing processes that have been frequently or recently used by the user higher than processes that the user has not been used as frequently and/or as recently.

At block 806, the process management service 221 assigns importance levels to the group of processes based at least in part on the priority order of the processes determined at block 804. In some embodiments, the process management service 221 may assign two or more distinct importance level to the processes in the group. For example, the process management service 221 may assign a certain number of lower-priority processes in the group to a low importance level (e.g., a cached importance level) and may assign a high or elevated importance level to the remaining processes (e.g., a service importance level). In another example, in addition to assigning a low importance level and a high importance level to the processes, the process management service 221 may additionally assign a certain number of processes in the group to an intermediate or standard importance level (e.g., a background importance level). As described below, having processes assigned to more than two importance levels may allow the process management service 221 additional time to detect processes that are terminated and additional time to react to those terminations by reassigning one or more processes to a lower importance level (e.g., as further described with reference to FIG. 10).

As discussed above, data associated with a process may be stored or serialized in order to preserve potentially difficult-to-replace data, such as user input or form data. However, saving state information and other data associated with a process may require the use of significant power and processing resources and may affect the performance of another process. For example, while serializing a process, another process that is rendering graphics on a display may be adversely affected. In light of the above, the process management service 221 may prioritize processes in the group such that processes that may benefit from serializing or storing their data in anticipation of termination may have a relatively high priority and/or may be associated with higher importance levels, in some embodiments. As a result, the process management service 221 may delay or avoid having to initiate the serialization or storing of those processes' data until lower-priority processes have been terminated. In other words, because the termination of lower-priority processes may signal an increased risk of termination for higher-priority processes, the process management service 221 may begin the costly process of serializing higher-priority processes only in response to determining that there is a high likelihood that those higher-priority processes will be terminated based on the termination of lower-priority processes.

Further, in some embodiments, the process management service may assign importance levels to processes that may not ordinarily be available to those processes. For example, while the group of processes is operating in the background, the operating system 216 may typically allow the processes to have a low importance level (e.g., a cached importance level) or a standard importance level (e.g., a background importance level). However, as the low-memory manager 219 may terminate several processes at once (including, in some cases, groups of processes), the process management service 221 may assign one or more of the highest priority processes to an elevated importance level that is not typically assigned to processes operating in the background (e.g., a visible importance level).

In some embodiments of the operations performed at block 806, the process management service 221 may utilize "virtual" importance levels to order the processes. In such embodiments, the virtual importance levels may be a ranking or ordering of the processes assigned to a common importance level. For example, the process management service 221 may notify the operating system 216 or low-memory manager 219 of the relative importance of each process assigned to a particular importance level. As such, the process management service 221 may enable the low-memory manager 219 to terminate processes in the same importance level based on these "virtual" importance levels. In some instance, rather than reassigning the processes to different importance levels at block 806, the process management service 221 may maintain the common or usual importance level of the processes and may instead assign virtual importance levels to each of the processes based on their priority order.

The process management service 221 may conclude performing the operations of the subroutine 800 by returning to block 304 of the routine 300 as described with reference to FIG. 3.

While the above description of the operations performed in the subroutine 800 are described with reference to the processes operating in the background, the process management service 221 may perform operations similar to those described above with reference to blocks 802, 804, and 806 while the processes are operating in the foreground. In such embodiments, the process management service 221 may also determine a priority order for the group of processes at block 804 and assign importance levels to the processes based on that priority order at block 806.

In some optional embodiments, the operations performed at blocks 804-806 may be performed by the process management service 221, the stub process, or a combination of both the process management service 221 and the stub process. For example, once the stub process has been substituted for the main process at block 802, the stub process may perform the various operations described with reference to blocks 804-806. As such, various operations described with reference to the process management service 221 may be implemented by or as part of the stub process.

Figure 9:
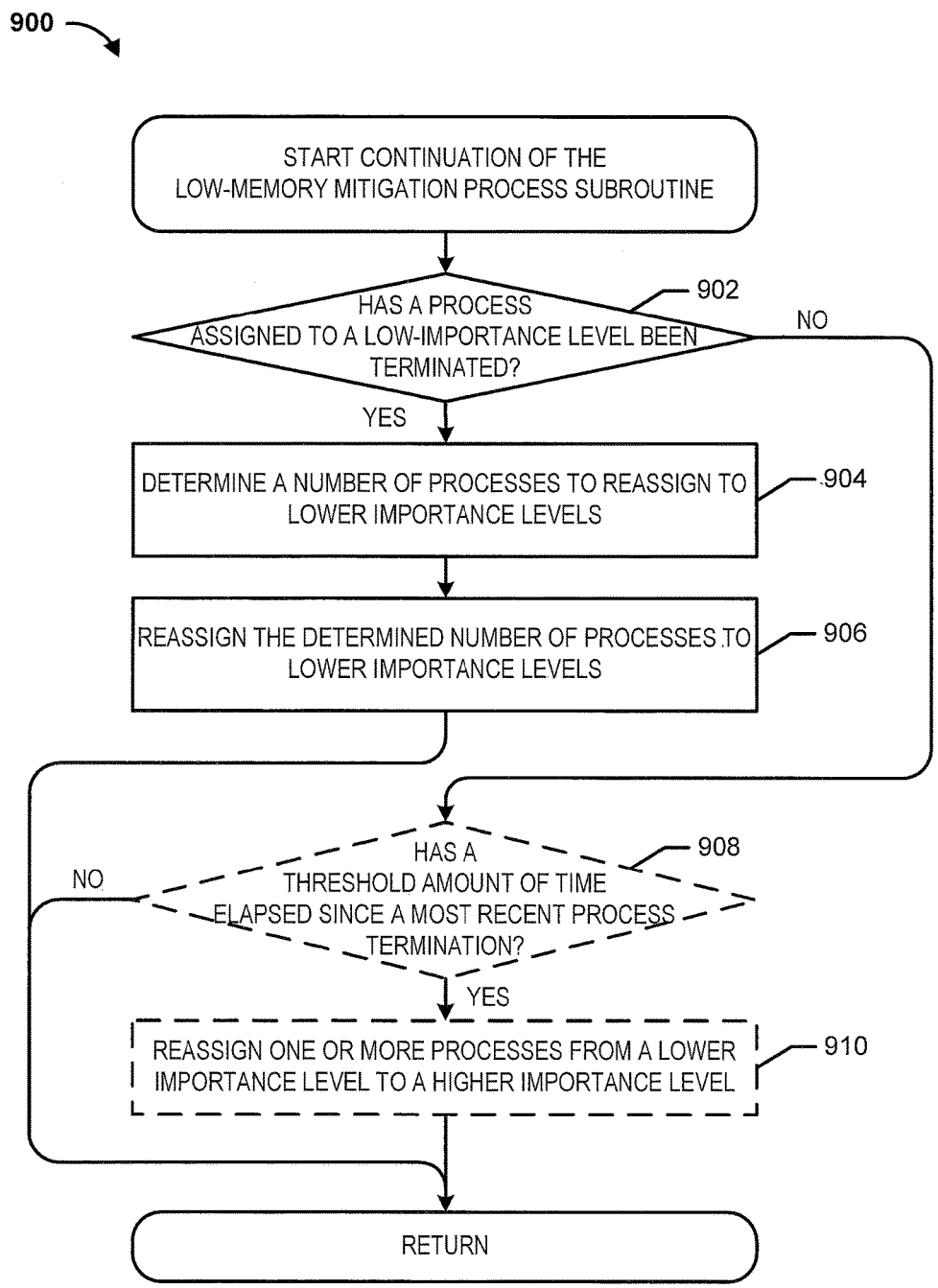
FIG. 9 is a process flow diagram illustrating a computer-implemented method for reassigning importance levels to processes in response to determining that other processes have been terminated, according to some embodiments.

FIG. 9 is a process flow diagram of an illustrative subroutine 900 for continuing an implementation of a low-memory mitigation process by dynamically reassigning one or more processes in a group of processes to lower-importance levels in response to the termination of one or more other processes in the group, according to some embodiments. In some embodiments, the subroutine 900 may be implemented with a process management service operating on a computing device (e.g., the process management service 221 of the computing device 102a as described with reference to FIG. 2). The operations of the subroutine 900 implement an embodiment of the operations of block 310 of the routine 300 (e.g., as described with reference to FIG. 3). In some embodiments, the process management service 221 may begin performing the operations of the subroutine 900 while the application is operating in the background (e.g., decision block 308 of the routine 300="NO").

In decision block 902, the process management service 221 determines whether a process assigned to a low-importance level has been terminated. For example, the process management service 221 may determine whether a low-memory manager 219 or the operating system 216 has sent a signal initiating the termination of one or more processes. In other examples, the process management service 221 may determine that a process assigned to a low-importance level has been terminated indirectly, such as by periodically polling the processes in the group to identify processes that are not responsive.

In some embodiments, in response to determining that a process assigned to a low-importance level has been terminated (i.e., decision block 902="YES"), the process management service 221 determines a number of processes to reassign to a lower-importance level at block 904. In some embodiments, the process management service 221 may calculate an amount of time that has passed between terminations, which may indirectly indicate or suggest the likelihood that the low-memory manager 219 will continue terminating processes. Specifically, a greater period of time between terminations may indicate that the low-memory manager 219 did not need to free a lot of memory in a relatively short period of time to accommodate the memory requirements of other applications (e.g., there is not a significant overall memory pressure). In contrast, a shorter period of time between terminations may indicate that the low-memory manager 219 was required to aggressively free up memory by terminating processes in rapid succession, thereby indicating a higher likelihood that the computing device is experiencing a more intense memory shortage. In such embodiments, the process management service 221 may reassign a comparatively smaller number of processes to the low-importance level when the time period between terminations is longer, and may assign a comparatively larger number of processes to the low-importance level when the time period between terminations is shorter.

In some embodiments, the process management service 221 may use other techniques to indirectly determine the likelihood that the low-memory manager 219 will continue terminating processes, and thus how many processes should be reassigned to lower-importance levels to prevent the low-memory manager 219 from terminating the highest priority processes in the group. For example, the process management service 221 may submit an input/output (I/O) request to the operating system 216 and may measure the latency of the operating system 216's response to the I/O request. Alternatively (or additionally), the process management service 221 may measure the latency of performing a processing task. Specifically, the process management service 221 may determine that the computing device may be running low on memory (and thus the low-memory manager 219 will likely continue terminating processes) in the event that the response to the I/O request or the completion of the processing task takes longer than expected. On the other hand, the process management service 221 may determine that there is a lower likelihood of a memory shortage on the computing device when the response to the I/O request is prompt and/or the processing task is completed quickly. In some embodiments, the process management service 221 may receive indications of the current performance of the computing device (e.g., current I/O levels for storage or network operations, CPU usage percentage, etc.) and may use those indications to determine the likelihood that the low-memory manager 219 will start or resume terminating processes. In such embodiments, the process management service 221 may receive this performance information from the operating system. Alternatively (or additionally), the process management service 221 may receive similar performance information regarding tasks performed by the group of processes, such as from the browser application 218.

At block 906, the process management service 221 reassigns the determined number of processes from the elevated importance level to the low-importance level, thereby decreasing the likelihood that higher-priority processes in the group will not be terminated, as described above. In some instance, the process management service 221 may consider dependencies among the processes when reassigning processes to lower importance levels at block 906. For example, one process that depends on another process may be reassigned to a lower importance level before (or instead of) the other process.

In some embodiments, the process management service 221 may reassign processes to lower importance levels in response to determining that those processes have had their state information stored or serialized. Specifically, a process that includes hard-to-replace data (e.g., user profile data or form data) may have a higher priority relative to other processes in the group until that hard-to-replace data is stored or serialized (e.g., until the data becomes more easily recoverable). At that time, the process management service 221 may lower the priority and/or importance level of the process as the cost of replacing that process may be significantly reduced after serializing the state information. In some further embodiments, the process management service 221 may voluntarily terminate processes after their state information is stored or serialized.

In response to reassigning the determined number of processes to lower-importance levels at block 906 or in response to determining that a process assigned to a low-importance level has not been terminated (i.e., decision block 902="NO"), the process management service 221 may continue performing operations by returning to block 310 of the routine 300.

In some optional embodiments, in response to determining that a process assigned to a low-importance level has not been terminated (i.e., decision block 902="NO"), the process management service 221 may determine whether a threshold amount of time has elapsed since a most recent process termination has occurred, in optional decision block 908. In such embodiments, the process management service 221 may maintain a timer or otherwise track an amount of time that has elapsed since the last process in the group was terminated. The amount of time that has elapsed may be an indirect indication of the amount of memory that is available on the computing device 102a and thus an indirect indication of the likelihood that processes assigned to lower importance levels will be terminated. For example, in the event that no process has been terminated in a threshold amount of time, the process management service 221 may determine that it may not be necessary to have a large number of processes assigned to a low importance level, which may put those processes at a higher risk of being terminated as noted above. As such, in response to determining that a threshold amount of time has elapsed since the most recent process termination (i.e., optional decision block 908="YES"), the process management service 221 may reassign one or more processes to a higher importance level from a lower importance level, at optional block 910. The process management service 221 may reassign, revert, or restore the importance level of one or more processes to a higher importance level after previously assigning those importance levels to a lower importance level. In an example, the process management service 221 may have initially assigned a process to an elevated importance level based on its priority relative to other processes in the group. At some later point, the process management service 221 may have reassigned the process to a standard or low importance level in anticipation of an aggressive termination of numerous processes by the low-memory manager. Thus, in the event that the process management service 221 determines that a threshold amount of time has elapsed since the last termination, the process management service 221 may determine there is a low risk that the low-memory manager will terminate a large number of processes, and as such, the process management service 221 may restore that process to an elevated importance level to ensure that that process with a relatively high priority has a lower likelihood of being terminated. In this way, the process management service 221 may further adjust the importance levels of one or more processes dynamically in order to control the order in which processes are terminated based on indirect evidence of available memory on the computing device 102a.

In some embodiments, the process management service 221 may revert or restore the original importance levels of processes in the group after reassigning them to a lower importance level by performing the operations at optional block 910 in one or more iterations. For example, the process management service 221 may reset the timer used to monitor the threshold amount of time each time after performing the operations at optional blocks 908 and 910. As such, the process management service 221 may perform the operations at optional blocks 908 and 910 each time the timer exceeds the threshold amount of time. In such embodiments, the process management service 221 may eventually restore the original importance levels for each process in the group that has not already been terminated.

In response to reassigning one or more processes from a lower importance level to a higher importance level at optional block 910 or in response to determining that a threshold amount of time has not elapsed since a most recent process termination has occurred (i.e., decision block 908="NO"), the process management service 221 may continue performing operations by returning to block 310 of the routine 300.

While various embodiments of the operations of the process management service 221 performed with reference to the subroutines 800 and 900 are described with reference to the group of processes operating in the background, the process management service may perform similar operations while the group of processes is operating in another state, such as in the foreground. For example, the process management service 221 may similar determine a priority order for a group of processes operating in the foreground and assign two or more importance levels to the processes in the group to influence the order in which a low-memory manager will terminate those processes.

Figure 10:
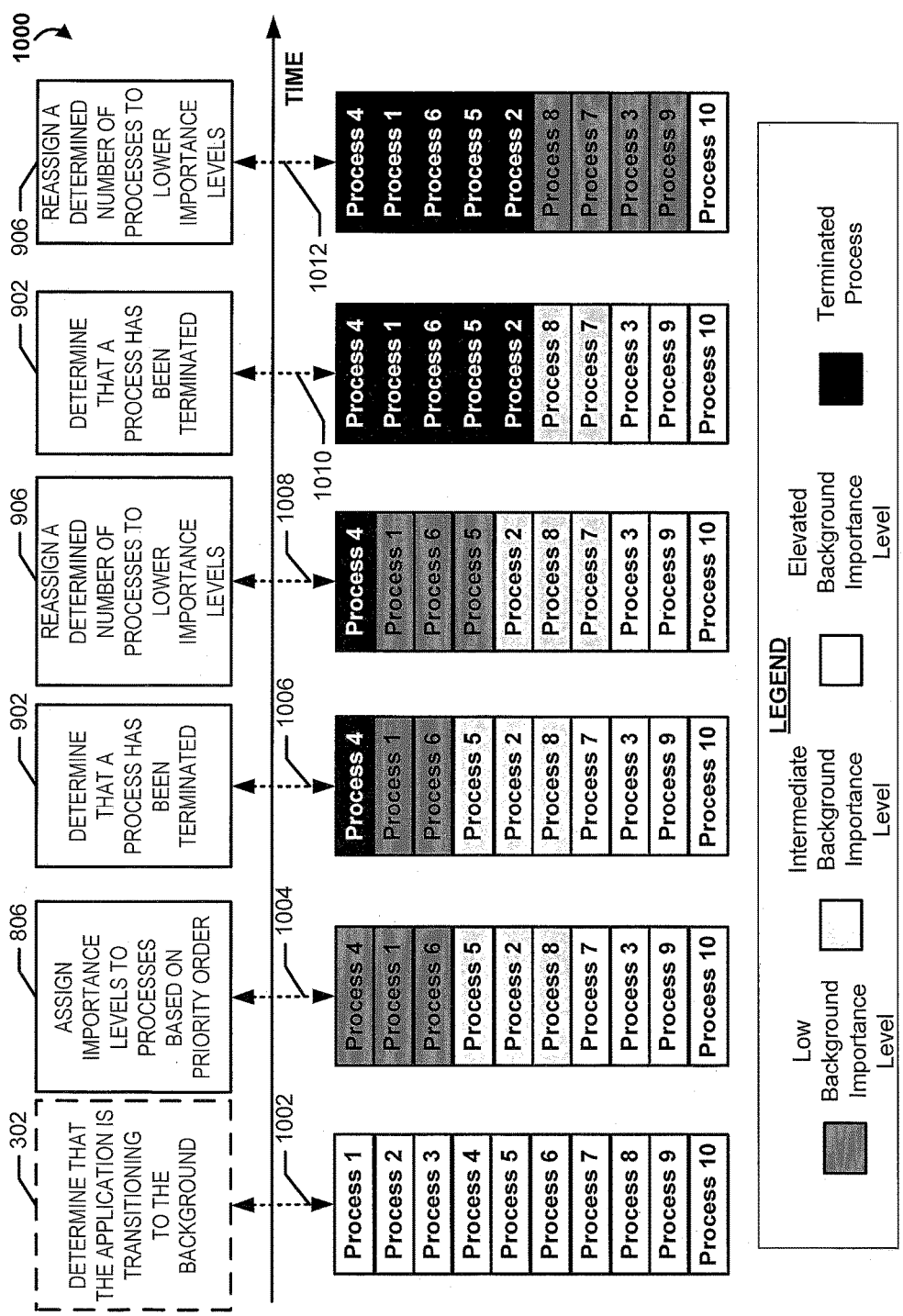
FIG. 10 is a component diagram illustrating an example of adjusting importance levels for processes in response to detecting that other processes have been terminated, according to some embodiments.

FIG. 10 is a time-line diagram 1000 illustrating dynamically assigning low-importance levels to one or more processes in a group of processes based on the respective priorities of processes in the group, according to some embodiments. As described, a process management service operating on a computing device (e.g., the process management service 221 as described with reference to FIG. 2) may actively and dynamically adjust the importance levels assigned to a group of processes in an attempt to ensure that those processes in the group with higher priorities may have a lower likelihood of being terminated in the background.

In the example illustrated in FIG. 10, the process management service 221 may determine at a time 1002 that an application associated with a group of processes is transitioning to the background, at block 302 (e.g., as described with reference to the routine 300 of FIG. 3). At the time 1002, the group of processes (illustrated in FIG. 10 as Processes 1-10) may all be assigned to the same importance level, such as an elevated background importance. At a time 1004, the process management service 221 may assign importance levels to each process in the group based on a determine priority order of the processes, at block 806 (e.g., as described with reference to method 304b of FIG. 8). For example, each process in the group may be ranked at the time 1004 based on one or more of an expected cost of replacing the process, whether the process is associated with hard-to-replace information (e.g., game state information, user form input data, etc.), and various other factors.

In some embodiments, the process management service 221 may stratify the processes by assigning different importance levels to different subsets of the group of processes. In the example illustrated in FIG. 10, the process management service 221 may assign Processes 1, 6, and 4 to a low background importance level, Processes 7, 2, and 10 to an intermediate background importance level, and may assign (or maintain) the elevated background importance level to Processes 5, 1, 8, and 9. As noted above, these assignments may be based on the relative priorities of the processes. In the example illustrated in FIG. 10 and for ease of description, the Processes 1-10 are illustrated in ascending order of priority from the process with the lowest priority (Process 4) to the process with the highest priority (Process 10). For instance, Process 4 may have a lower priority than Process 5, which in turn may have a lower priority than Process 7. By assigning importance levels to the Processes 1-10 based on their respective priorities, the process management service 221 may ensure that the low-memory manager 219 terminates lower-priority processes before higher-priority processes in the event that the low-memory manager 219 begins terminating the processes in the background to free additional memory.

At a time 1006, the process management service 221 may determine that Process 4 has been (or will be) terminated, at block 902 (e.g., as described with reference to subroutine 900 of FIG. 9). For example, the process management service 221 may receive an indication from the operating system 216 or from the low-memory manager 219 that Process 4 specifically is scheduled as the next process to be terminated, or the process management service 221 may determine that a termination signal for Process 4 has been received. The indication that Process 4 was terminated or will be terminated may indicate that the computing device has insufficient available memory for more important applications, which may further indicate that the low-memory manager 219 will continue terminating processes if additional memory is still needed. As described above, the process management service 221 may be unable to directly determine the amount of memory that is available on the computing device, and thus may determine that the termination of the Process 4 indicates a greater likelihood that additional processes will be terminated.

In response to the termination of Process 4, the process management service 221 may reassign a determined number of the processes that are remaining in the group (e.g., Process 1-3 and 5-10) to lower importance levels, at block 906 (e.g., as described with reference to the subroutine 900 of FIG. 9) at a time 1008. Specifically, the process management service 221 may lower the importance levels of one or more of the processes in the group to replace any terminated process and to ensure that the highest priority processes in the group continue to be "shielded" from termination by the low-memory manager 219.

In the example illustrated in FIG. 10, the processes management service may determine that only one process (Process 4) was terminated, which may indicate that the computing device may only be slightly low on memory and that the low-memory manager 219 will not need to terminate several processes in the near future. In this example, the processes management service may determine that only one or a few processes should be reassigned to lower importance levels because the likelihood of losing many processes at substantially the same time is currently low. As such, the process management service 221 may lower the importance level of the Process 5 from an intermediate background importance level to a low background importance level to "replace" Process 4. Similarly, the process management service 221 may lower the priority of Process 7 to the intermediate background importance level to "replace" Process 5.

In determining which of the processes assigned to each importance level to reassign to a lower importance level, the process management service 221 reassign processes based on their priorities relative to other processes assigned to the same importance level. Thus, in the example illustrated in FIG. 10, at the time 1008, the process management service 221 may reassign Process 5 to the low background importance level because Process 5 has the lowest priority process among the processes assigned to the intermediate background importance level. Similarly, the process management service 221 may reassign Process 7 to the intermediate background importance level from the elevated background importance level because Process 7 had the lowest priority among the processes assigned to the elevated background importance level.

At a time 1010, the process management service 221 may detect that processes have been terminated, at block 902, such as by performing operations as described above. Specifically, at the time 1010, the process management service 221 may determine that the low-memory manager 219 has begun to terminate processes aggressively in order to free a large amount of memory. In the illustrated example, the process management service 221 may determine that the low-memory manager 219 terminated Processes 1, 2, 5, and 6. The process management service 221 may also determine that there is a considerable likelihood that the low-memory manager 219 will continue to terminate processes in view of the relatively large number of processes in the group that were terminated. In some embodiments, the process management service 221 may determine whether processes assigned to the intermediate background importance level have been terminated, which may indicate that the low-memory manager 219 has terminated all available processes assigned to the low background importance level without freeing up a sufficient amount of memory, thereby causing the low-memory manager 219 to begin terminating processes in higher importance levels. In the example illustrated in FIG. 10, the process management service 221 may determine that Process 2 was assigned to the intermediate background importance level and that Process 2 has been terminated, indicating a heighten risk that the low-memory manager 219 will continue terminating higher-priority processes in the group.

Thus, at a time 1012, the process management service 221 may again reassign a determined number of processes in the group to lower importance levels to respond to the low-memory manager 219's aggressive termination of Processes 1, 2, 5, and 6, at block 902. Specifically, the process management service 221 may determine the number of processes to reassign based at least in part on the number of processes that were terminated or are expected to be terminated. In some embodiments in the process management service 221 determines that there is a high likelihood that all of the processes in the group may be terminated, the process management service 221 may lower the importance levels for all but the highest priority processes to the low background importance level in the hopes that the low-memory manager 219 will be able to free the needed amount of memory without needing to terminate the highest priority processes in the group. In the example illustrated in FIG. 10, the process management service 221 may lower the importance levels of the Processes 3, 7, 8, and 9 to the lowest importance level (e.g., the low background importance level) to provide a buffer for Process 10, which may be the highest priority process in the group, for example, because Process 10 is the main process of the group. Therefore, by dynamically adjusting the importance levels for the processes in the group in response to terminations of one or more processes in the group, the process management service 221 may effectively determine the order in which the processes are terminated to increase the likelihood that higher priority processes will survive in the background.

Figure 11:
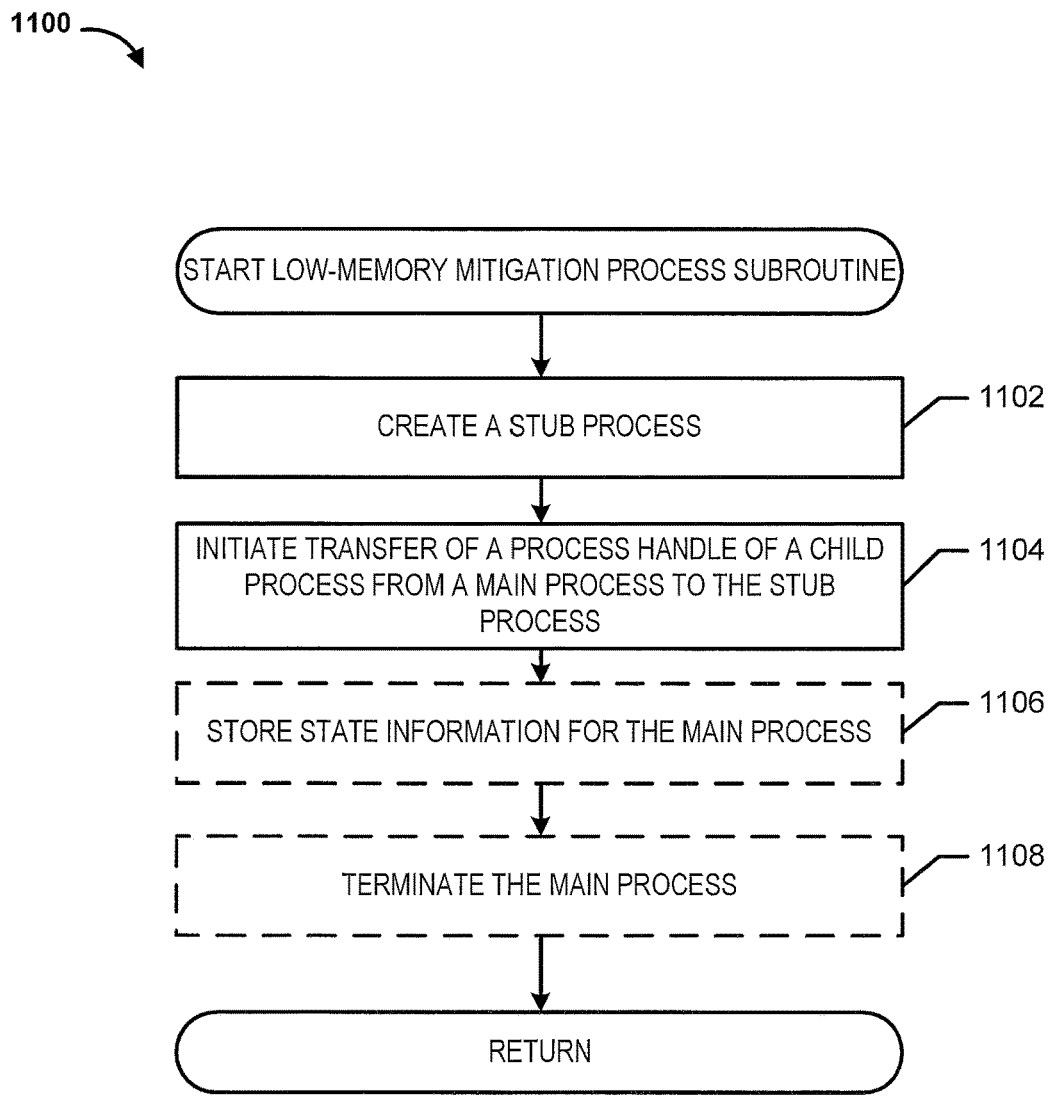
FIG. 11 is a process flow diagram illustrating a computer-implemented method for initiating transfer of process handles of child processes from a main process to a stub process, according to some embodiments.

FIG. 11 is a process flow diagram of a subroutine 1100 for implementing a low-memory mitigation process by replacing a main process of a group of processes with a stub process, according to some embodiments. In some embodiments, the method 1100 may be implemented with a process management service operating on a computing device (e.g., the process management service 221 of the computing device 102a as described with reference to FIG. 2). In some optional embodiments, the operations of the subroutine 1100 implement an embodiment of the operations of block 304 of the method 304 as described with reference to FIG. 3. In such embodiments, the process management service 221 may begin performing the operations of the subroutine 1100 in response to determining that the application is transitioning to the background at block 302 of the routine 300 (e.g., as described with reference to FIG. 3).

In some embodiments, an application (e.g., the browser application 218) may include and/or be associated with a main process and one or more child processes. The main process may coordinate the activities of the one or more child processes, as well as managing the process handles, bindings, and/or process IDs for the one or more child processes. As described above, in the event that the main process is terminated, the process handles and/or process IDs for the one or more child processes may be lost, resulting in the termination of those child processes. Further, in comparison to the memory usage of each of the one or more child processes, the main process may require a considerably larger amount of memory. As such, after the browser application 218 has transitioned to the background, the main process may be at a higher risk of termination in comparison with the risk that a child process will be terminated because the low-memory manager 219 may terminate the main process due to the comparatively large amount of memory the main process uses. To avoid termination of the main process, as well as the one or more child processes, the main process may be temporarily replaced with the stub process while the browsing application is operating in the background, as further described in the following operations.

At block 1102, the process management service 221 creates a stub process. In some embodiments, the stub process may be a process with no or limited functionality. For example, the stub process may not include or load a full complement (or any) software libraries and may not be able perform any active services or operations. As a result, the stub process may have a memory usage that is significantly less than the memory usage of the main process. In a non-limiting example, the stub process may use five megabytes of memory, whereas the main application may use one-hundred megabytes of memory.

In some embodiments of the operations performed at block 1102, the process management service 221 may create the stub process in response to a low-memory triggering event. The low-memory triggering event may occur when the process management service 221 receives a low-memory indication from the low-memory manager 219, which may indicate that the main process is scheduled for termination. Other triggering events may include an indication that the application is about to transition to the background (e.g., as described with reference to block 302 of FIG. 3) or that a child process has been terminated. In another example, a low-memory triggering event may occur in response to the creation of a child process. In this example, the process management server 221 may determine that the creation of the child process is associated with a low-memory notification. In yet another example, the process management service 221 may determine that a low-memory triggering event has occurred based on one or more flags that are used to create the child process (e.g., a low-memory flag). These flags may be used in an effort to decrease the likelihood that the child process will be terminated and may be set by the process management service 221, the user, the operating system 216, the low-memory manager 219, or one or more other components operating on the computing device 102a.

In some embodiments, the process management service 221 may wait to create the stub process and terminate the main process at block 1112 as described further herein until there is some evidence that the computing device is running low on memory and that the main process may be a likely target for termination due to its comparatively large memory usage.

At block 1104, the process management service 221 may initiate transfer of a process handle of a child process from a main process to the stub process, such as by establishing inter-process communication channels between the stub process and the main process to enable the main process to transfer the handles/identifiers for the child process to the stub process. Other processes for exchanging child handles, identifying information, and other information necessary to maintain the child processes may be employed. For example, the process management service may determine a service name of the child process and may transfer the process handle of the child process from the main process to the stub process using the service name of the child, such as by performing a look up of the child's service name and determining the child's process handle information based on the look up. In another example, the process management service 221 may create or open a shared memory location (e.g., a shared file or a shared memory file) using a predetermined naming schedule. In this example, the process management service 221 may cause the main process to write process handle information for the child process to the shared memory location, and process management service 221 may notify the stub process of the availability of this information in the shared memory location. In response, the stub process may access the shared memory location to obtain the process handle information of the child process. By transferring the process handle of the child processes to the stub process, the process management service 221 may lower the likelihood that the low-memory manager 219 will terminate the entire group of processes because the stub process uses much less memory than the main process, and the low-memory manager 219 typically terminates processes that use more memory before those that use less memory, as described.

In some optional embodiments, the process management service 221 may optionally store state information for the main process, in optional block 1106. For example, the process management service 221 may initiate serialization of state information for the main process, and this serialized state information may be stored locally on the computing device and/or remotely, such as in a data storage unit of a server in communication with the computing device (e.g., the server 118 of FIG. 1). The serialized information may include customer information, form input data, application state information, and various other information/data.

In some optional embodiments, once the transfer of the process handle of the child process from the main process to the stub process has completed at block 1104, the process management service 221 may optionally terminate the main process, at optional block 1108. By terminating the main process (which may be using a relatively large amount of memory), the process management service 221 may preemptively free up memory on the computing device 102a and, as a result, decrease the likelihood that the low-memory manager 219 will need to terminate processes in the group to free up additional memory.

In some embodiments, rather than terminating the main process at optional block 1108, the process management service 221 may allow both the main process and the stub process to operate. When the group of processes returns to the foreground, the process handle of the child process may be transferred back from the stub process to the main process in the event that the main process was not terminated while in the background. In this event, the process management service 221 may not need to expend resources to restart the main process.

In some other embodiments (not shown), rather than terminating the main process at optional block 1108, the process management service 221 may lower the importance level of the main process (e.g., to a cached importance level) so that the main process will be terminated before the other process in the group in the event that the low-memory manager needs to free memory. However, in the event that the low-memory manager does not need to terminate the main process, the main process may not need to be restarted, thereby saving the cost of restarting the main process in terms of power, time, and processing resources. In such embodiments, the process management service 221 may cause the assignment of a low importance level to the main process by notifying the operating system 216 that the main process has a low importance or priority or by assigning the main process to the low importance level, such as by utilizing service calls to the operating system to directly change the importance level of the main process.

Thus, the process management service 221 may continue performing operations in decision block 308 of the routine 300 (e.g., as described with reference to FIG. 3), in some optional embodiments. In other embodiments, the process management service 221 may continue by performing receiving information regarding background memory thresholds utilized on similar computing device from a server, at block 404 of the subroutine 400 (e.g., as described with reference to FIG. 4).

The process management service 221 may conclude performing the operations of the subroutine 1100 by returning to block 304 of the routine 300 (see FIG. 3).

In some embodiments, rather than creating the stub process at block 1102, the process management service 221 may utilize a stub process that is already operating on the computing device 102*a*. For example, the stub process may be a system process (e.g., a daemon) that was previously created, either by the process management service 221 or by the operating system 216. In further embodiments, once created, the stub process may not be terminated by the low-memory manager, for example, because the stub process is associated with a very high or "unkillable" importance level. In these circumstances, the stub process may function as a permanent or semi-permanent "placeholder" that maintains process handles. The process management service 221 may then utilize the pre-existing stub process to receive and manage child process handles from a main process before terminating the main process, and upon restarting the main process, may transfer the child process handles back to the restarted main process without terminating the stub process.

While the above descriptions refer to a "stub process," in some embodiments, the process management service 221 may replace the main process with a parallel process. In such embodiments, the parallel process may include more functionality than the stub process, but may still require less memory than the main process. For example, the process management service 221 may initiate the creation of a new main process. The new main process may require less memory than the old main process because the new main process has not been used and thus may have accumulated/been associated with less data than the old main process and, as a result, may need less memory to operate than the old main process.

Figure 12:
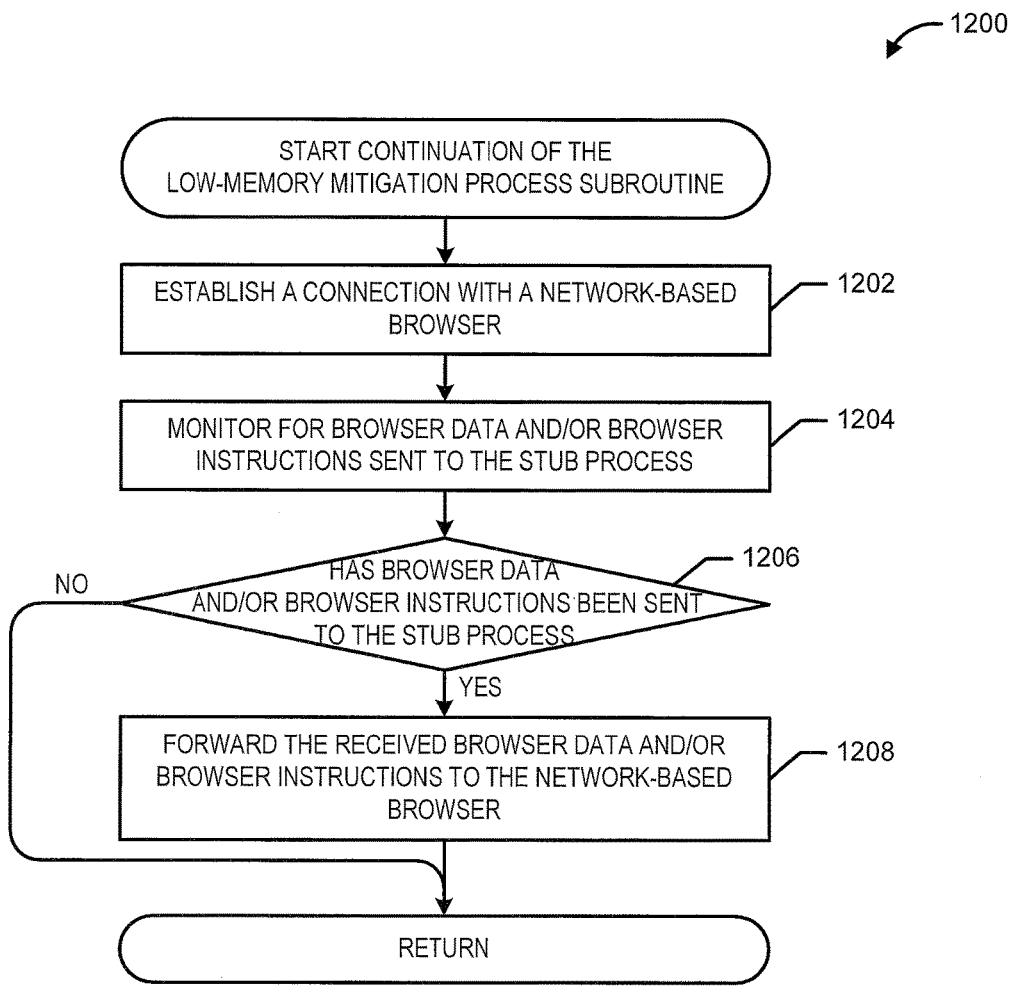
FIG. 12 is a process flow diagram illustrating a computer-implemented method for forwarding browser data intended for a stub process operating on a computing device to a network-based browser application operating as part of a network browsing service, according to some embodiments.

FIG. 12 is a process flow diagram of an illustrative subroutine 1200 for continuing the implementation of a low-memory mitigation process by forwarding browser data from a stub process to a network-based browser for processing, according to some embodiments. In some embodiments, the subroutine 1200 may be implemented with a process management service operating on a computing device (e.g., the process management service 221 of the computing device 102*a* as described with reference to FIG. 2). In some optional embodiments, the operations of the subroutine 1200 implement an embodiment of the operations of block 310 of the routine 300 as described with reference to FIG. 3. In such embodiments, the process management service 221 may begin performing the operations of the method 1200 in response to determining that the application is operating in the background in decision block 306 of the routine 300.

As described above, the stub process may have limited or no functionality and thus may be unable to perform typical operations that the browser application 218 may perform in the background. However, in some embodiments, the process management service 221 may leverage a network-based browser application (e.g., the network-based browser application 126) to perform various browser-related operations that the stub process may be unable to accomplish. Thus, in such embodiments, the process management service 221 establishes a connection with a network-based browser service, at block 1202. In some embodiments, the network-based browser service may operate on a server (e.g., the server 118 as described with reference to FIG. 2).

The process management service 221 also monitors for browser data and/or browser instructions sent to the stub process for use or processing, at block 1204. In an example, this browser data may originate from a child process, the operating system 216, and/or various other entities operating locally on the computing. In another example, this browser data may originate from one or more other computing devices, resource servers, and/or various other network components.

In decision block 1206, the process management service 221 determines whether browser data and/or browser instructions have been sent to the stub process. In response to determining that browser data and/or browser instructions have been sent to the stub process (i.e., decision block 1206="YES"), the process management service 221 forwards the received browser data and/or browser instructions to the network-based browser application for processing, at block 1210. In particular, by forwarding the data to the network-based browser application, the process management service 221 may enable partial background functionality of the browser application 218 on the computing device for which the main process would have ordinarily been responsible while using the stub process to decrease the likelihood that the entire group of processes related to the browser application 218 will be terminated by the low-memory manager 219.

In response to determining that no browser data and/or browser instructions have been sent to the stub process (i.e., decision block 1206="NO") or in response to forwarding the received browser data and/or instructions at block 1210, the process management service 221 may conclude performing the operations of the subroutine 1200 by returning to block 310 of the routine 300 as described with reference to FIG. 3.

Figure 13:
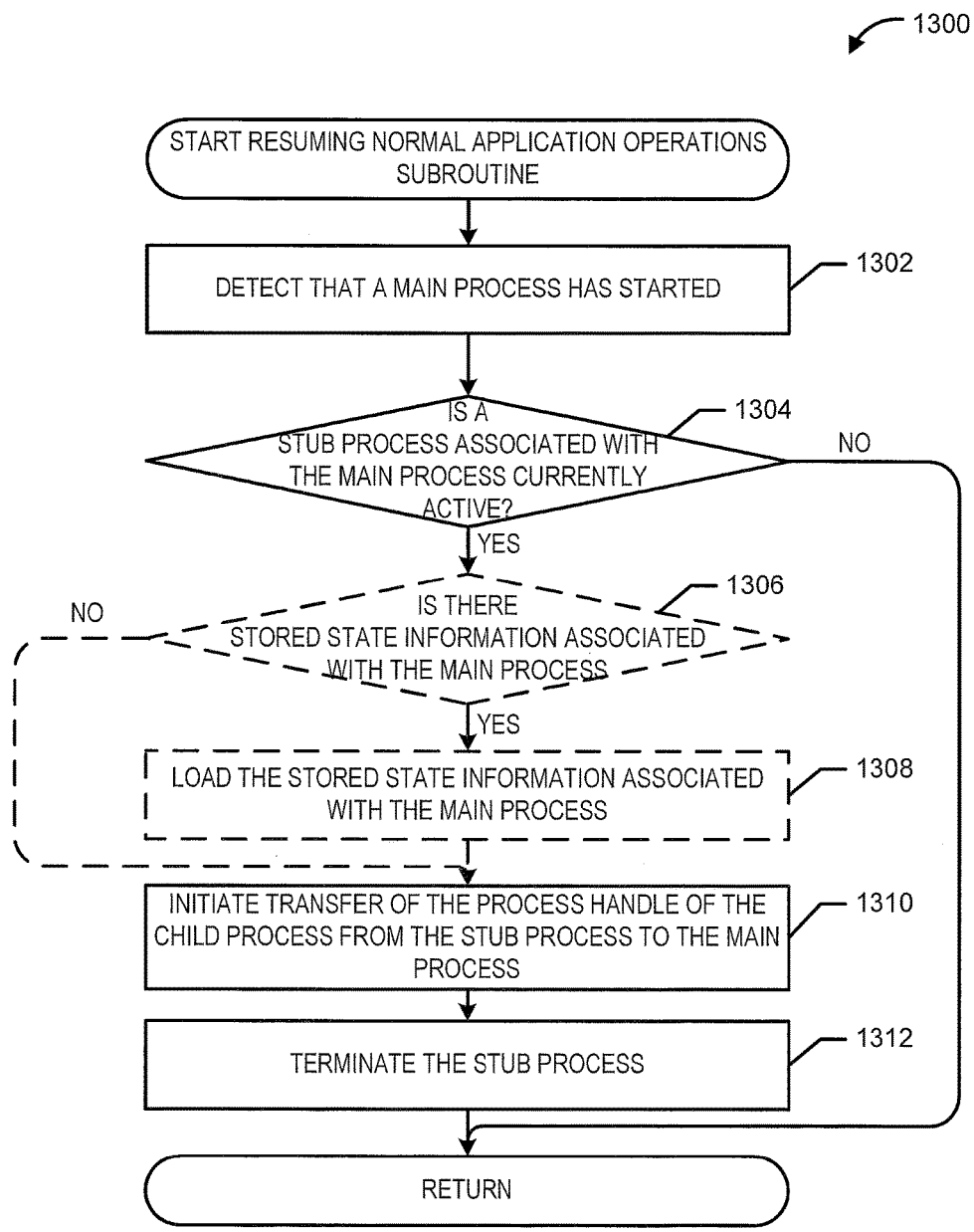
FIG. 13 is a process flow diagram illustrating a computer-implemented method for transferring process handles of child processes from a stub process back to a main process, according to some embodiments.

FIG. 13 is a process flow diagram of a subroutine 1300 for resuming normal application operations by replacing a stub process with a main process, according to some embodiments. In some embodiments, the subroutine 1300 may be implemented with a process management service operating on a computing device (e.g., the process management service 221 of the computing device 102a as described with reference to FIG. 2). The operations of the subroutine 1300 implement an embodiment of the operations of block 312 of the routine 300 as described with reference to FIG. 3. Thus, the process management service 221 may begin performing the operations of the subroutine 1300 in response to determining that the application is not operating (or no longer operating) in the background (i.e., decision block 306 of the routine 300="NO").

At block 1302, the process management service 221 may determine that a main process has started. For example, the process management service 221 may monitor for an indication from the operating system 216 that the user has restarted the application. In decision block 1304, the process management service 221 may determine whether an active stub process is associated with the main process. As described above (e.g., with reference to FIG. 11), the process management service 221 may substitute a stub process for a main process in order to reduce the overall memory usage of a group of processes related to the application, thereby reducing the likelihood that the low-memory manager will terminate the entire group of processes. Further, as part of replacing the main process with the stub process, the process management service 221 may store associate identifying information for the stub process with the main process, in some embodiments. Thus, once the main process restarts, the process management service 221 may reference this stored information to locate and/or identify the stub process associated with the main process.

In response to determining that a stub process is associated with the main process (i.e., decision block 1304="YES"), the process management service 221 may optionally determine whether there is stored state information associated with the main process, in optional decision block 1310. Thus, in response to determining that there is stored state information associated with the main process (i.e., optional decision block 1306="YES"), the process management service 221 may load/reload the stored state information associated with the main process, in optional block 1308. As described (e.g., in optional block 1310 of the subroutine 1300), before terminating the main process and replacing it with a stub process, the process management service 221 may store various information related to the main process, either locally or in a network-based data repository, until the main process restarts. This serialized information may be reloaded into the main process, thereby recovering information that may have otherwise been lost upon terminating the main process.

In response to determining that there is no stored state information associated with the main process (i.e., optional decision block 1306="NO") or while/subsequent to loading the stored state information in optional block 1308, the process management service 221 may initiate transfer of a process handle of a child process from the stub process associated with the main process to the main process, at block 1310. In some embodiments of the operations performed at block 1310, the process management service 221 may reverse the operations performed at block 1104 of the subroutine 1100 as described with reference to FIG. 11.

Upon completion of the operations at block 1310, the process management service 221 may terminate the stub process at block 1312 as the application may no longer be operating in the background and the stub process may no longer been needed to reduce the likelihood that one or more processes associated with the application will be terminated in the background.

In response to determining that there is no stub process associated with the main processes (i.e., decision block 1304="NO") or in response to terminating the stub process at block 1312, the process management service 221 may conclude performing the operations of the subroutine 1300 by returning to block 312 of the routine 300 as described with reference to FIG. 3.

For ease of description, various embodiments described in this description may refer to a group of processes or a set of linked processes associated with a browser application 218. However, the process management service 221 may implement various embodiments described above to implement low-memory mitigation processes for groups of processes associated with various other types of applications. In such embodiments, the process management service 221 may perform operations similar to those operations described above for groups of processes related to various types of applications.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computing device comprising:
    a memory having a finite size for storing one or more processes utilized in the execution of a software application, wherein the memory comprises a browser application having a set of linked processes that are dependent on a main process; and
    a processor coupled to the memory and configured to execute processor-executable instructions to perform operations comprising:
        determining that multiple applications are operating on the computing device and that there is a low amount of memory available for the set of linked processes of the browser application;
        creating a stub process corresponding to the main process of the browser application;
        associating the stub process with less memory than an amount of memory associated with the main processes;
        initiating transfer of process handles of a first child process and a second child process of the set of linked processes from the main process to the stub process;
        assigning a first background importance level to the first child process;
        assigning a second background importance level to the second child process, the second background importance level being lower than the first background importance level;
        assigning a high importance level to the stub process, wherein the high importance level prevents the stub process from being terminated; and
        subsequent to the transfer of the process handles of the child processes to the stub process, causing a termination of the main process.

2. The computing device of claim 1, wherein the processor is configured to execute processor-executable instructions to perform operations further comprising:
    determining that the main process of the browser application has restarted;
    initiating transfer of the process handles of the child processes from the stub process to the restarted main process; and
    subsequent to the transfer of the process handles of the child processes to the restarted main process, causing termination of the stub process.

3. The computing device of claim 2, wherein the processor is configured to execute processor-executable instructions to perform operations such that causing termination of the main process further comprises storing state information of the main process on the computing device.

4. The computing device of claim 3, wherein the processor is configured to execute processor-executable instructions to perform operations such that determining that the main process of the browser application has restarted further comprises:
    retrieving the stored state information of the main process; and
    loading the retrieved stored state information.

5. A method for managing software applications on a computing device, wherein individual software applications are executed on the computing device, the method comprising:
    determining that a low-memory triggering event has occurred for an application having a set of linked processes and memory associated with each process of the set of linked processes;
    creating a second process linked to the set of linked processes, wherein the second process utilizes less memory than a first process of the set of linked processes and has reduced functionality relative to the first process;
    initiating transfer of process handles of a first child process and a second child process of the set of linked processes from the first process to the second process;
    assigning a first background importance level to the first child process;

assigning a second background importance level to the second child process, the second background importance level being lower than the first background importance level;

assigning a high importance level to the second process, wherein the high importance level prevents the second process from being terminated; and causing termination of the first process.

6. The method of claim 5, further comprising storing state information associated with at least one of the first child process and the second child process.

7. The method of claim 5, wherein determining that a low-memory triggering event has occurred for an application having a set of linked processes comprises determining that at least one of the first child process and the second child process was created using a low-memory flag.

8. The method of claim 5, wherein the application is a browser application operating on the computing device.

9. The method of claim 8, wherein at least one of the first child process and the second child process corresponds to at least one of a tab, a web page having a transient state, or a user interface element of the browser application.

10. The method of claim 5, wherein creating the second process comprises:
   determining an amount of memory resources required to create the second process;
   de-allocating the determined amount of memory resources from memory resources allocated to the first process; and
   creating the second process using at least a portion of the de-allocated memory resources.

11. The method of claim 5, wherein initiating transfer of the process handle of each child process from the first process to the second process comprises:
   establishing an inter-process communication channel between the first process and the second process; and
   transferring the process handle of the child process from the first process to the second process via the inter-process communication channel.

12. The method of claim 5, wherein initiating transfer of the process handle of each child process from the first process to the second process comprises:
   determining a service name of the child process; and
   transferring the process handle of the child process from the first process to the second process using the service name of the child process.

13. The method of claim 5, wherein initiating transfer of the process handle of each child process from the first process to the second process comprises:
   opening a shared memory location available to both the first process and the second process;
   causing the first process to store the process handle of the child process at the shared memory location; and
   notifying the second process that the first process has stored the process handle of the child process at the shared memory location.

14. The method of claim 13, wherein the shared memory location is a shared memory file having a predetermined naming schedule.

15. The method of claim 5 further comprising:
   determining that the first process has restarted subsequent to the termination of the first process;
   initiating transfer of the process handles of the child processes from the second process to the restarted first process; and
   causing termination of the second process.

16. The method of claim 15, wherein initiating transfer of the process handles of the child processes from the second process to the restarted first process further comprises determining that the restarted first process is associated with the second process.

17. The method of claim 5, wherein causing termination of the first process comprises:
   storing state information of the first process on the computing device; and
   causing termination of the first process subsequent to storing the state information.

18. The method of claim 17 further comprising:
   retrieving the stored state information of the first process; and
   loading the retrieved stored state information.

19. The method of claim 5 further comprising forwarding data intended for the second process to a server.

20. The method of claim 19 further comprising:
   receiving the data intended for the second process on the server;
   processing the data intended for the second process with the server; and
   performing at least one operation on the server based on the processed data.

21. The method of claim 20, wherein:
   the data intended for the second process comprises browser data; and
   processing the data intended for the second process comprises processing the browser data with a network-based browser application on the server.

22. A non-transitory, computer-readable medium having stored thereon computer-executable software instructions configured to cause a processor of a computing device to perform operations comprising:
   determining that a low-memory triggering event has occurred;
   creating a parallel process executed in parallel with a main process, wherein the parallel process utilizes less memory than the main process;
   duplicating data of process handles of a first child process and a second child process associated with the main process;
   associating the duplicated data of the process handles of the first child process and the second child process with the parallel process;
   causing assignment of a first background importance level to the first child process;
   causing assignment of a second background importance level to the second child process, the second background importance level being lower than the first background importance level;
   assigning a high importance level to the parallel process, wherein the high importance level prevents the parallel process from being terminated; and
   causing assignment of a low importance level to the main process, wherein the low importance level is lower than the second background importance level.

23. The non-transitory, computer-readable medium of claim 22, wherein the stored computer-executable software instructions are configured to cause a processor of the computing device to perform operations such that causing assignment of a low importance level to the main process comprises notifying an operating system of the computing device that the main process has a low importance.

24. The non-transitory, computer-readable medium of claim 22, wherein the stored computer-executable software instructions are configured to cause a processor of the computing device to perform operations such that causing assignment of a low importance level to the main process comprises assigning the main process to the low importance level.

25. The non-transitory, computer-readable medium of claim 22, wherein the stored computer-executable software instructions are configured to cause a processor of the computing device to perform operations further comprising:
   determining that the main process has restarted;
   duplicating the data of the process handles of the child processes associated with the parallel process;
   associating the data of the process handles of the child processes with the restarted main process; and
   causing termination of the parallel process.

26. The non-transitory, computer-readable medium of claim 22, wherein the stored computer-executable software instructions are configured to cause a processor of the computing device to perform operations such that determining that a low-memory triggering event has occurred comprises determining that a battery level of the computing device is below a threshold battery level.

27. The non-transitory, computer-readable medium of claim 22, wherein the stored computer-executable software instructions are configured to cause a processor of the computing device to perform operations such that determining that a low-memory triggering event has occurred comprises determining that a threshold amount of memory is not available on the computing device.

28. The non-transitory, computer-readable medium of claim 22, wherein the stored computer-executable software instructions are configured to cause a processor of the computing device to perform operations such that determining that a low-memory triggering event has occurred comprises determining that the main process and the child processes will be moved to a background state.

29. The non-transitory, computer-readable medium of claim 22, wherein the stored computer-executable software instructions are configured to cause a processor of the computing device to perform operations such that determining that a triggering event has occurred comprises determining that another child process associated with the main process has been terminated.

30. The non-transitory, computer-readable medium of claim 22, wherein at least one of the first child process and the second child process corresponds to a loaded page in a browser application operating on the computing device.

31. The non-transitory, computer-readable medium of claim 22, wherein the stored computer-executable software instructions are configured to cause a processor of the computing device to perform operations such that creating the parallel process comprises:
   determining an amount of memory resources required to create the parallel process;
   de-allocating the determined amount of memory resources from memory resources allocated to the main process; and
   creating the parallel process using at least a portion of the de-allocated memory resources.

32. The non-transitory, computer-readable medium of claim 22, wherein the stored computer-executable software instructions are configured to cause a processor of the computing device to perform operations such that associating the data of the process handle of each child process with the parallel process comprises:
   establishing an inter-process communication channel between the main process and the parallel process; and
   transferring the process handle of the child process from the main process to the parallel process.

\* \* \* \* \*